UNITED STATES PATENT OFFICE.

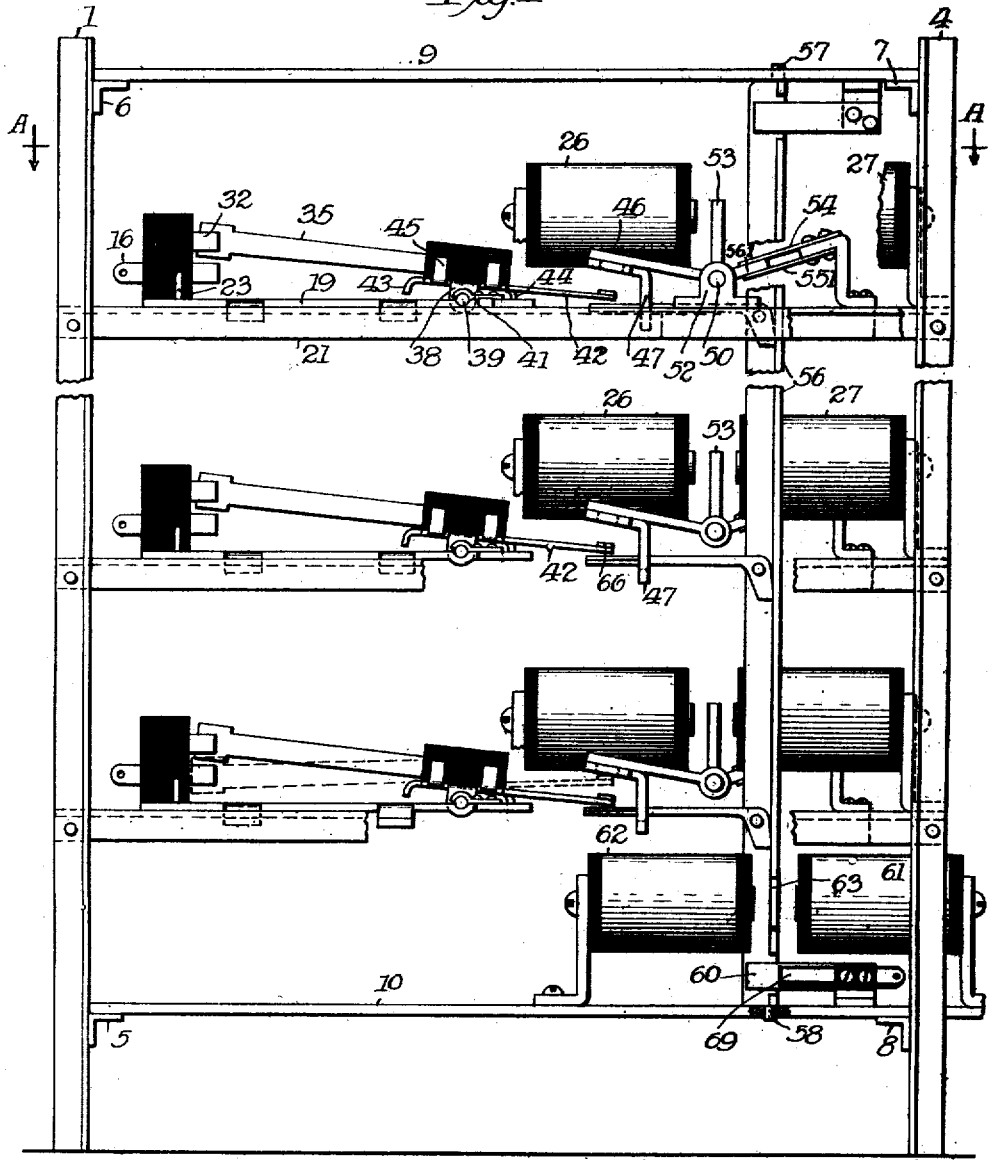

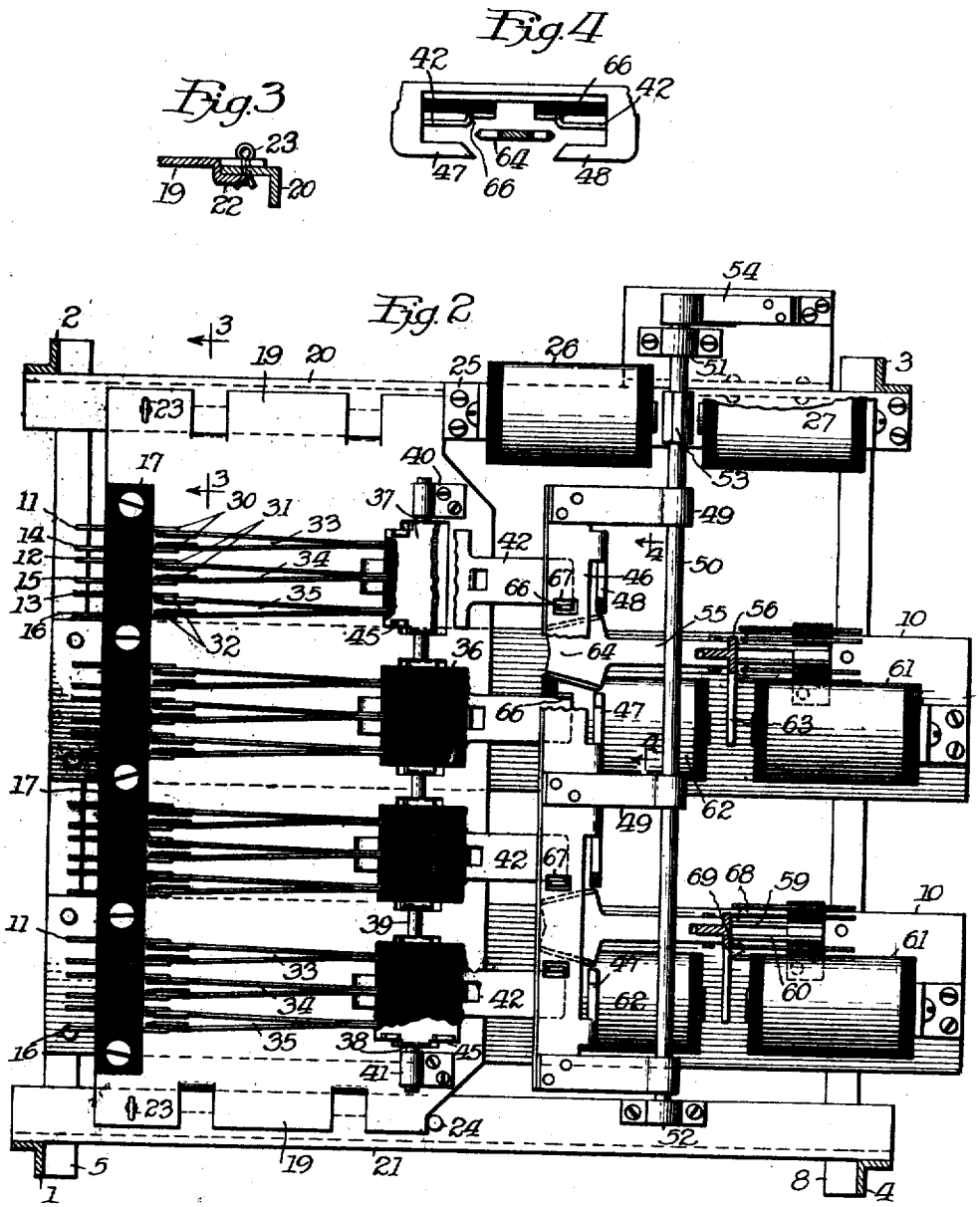

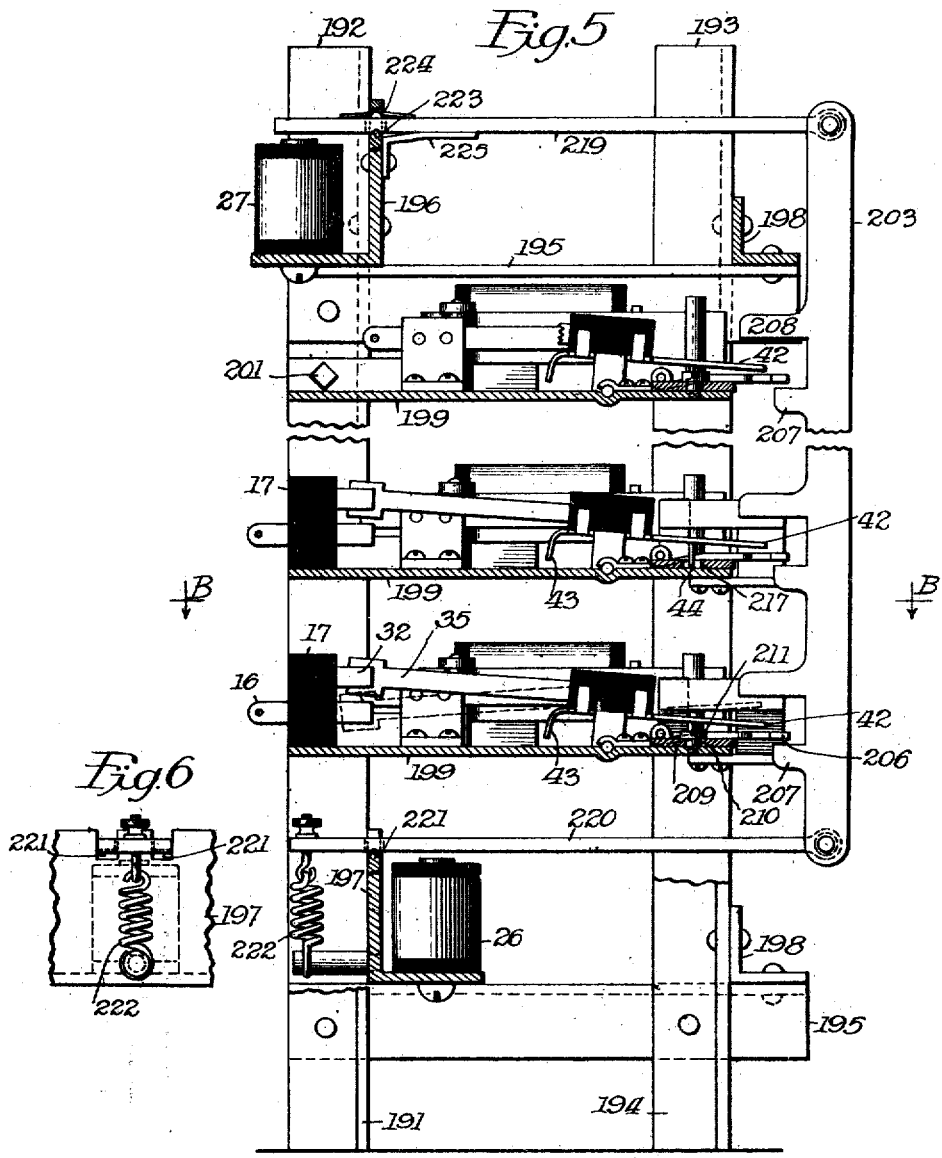

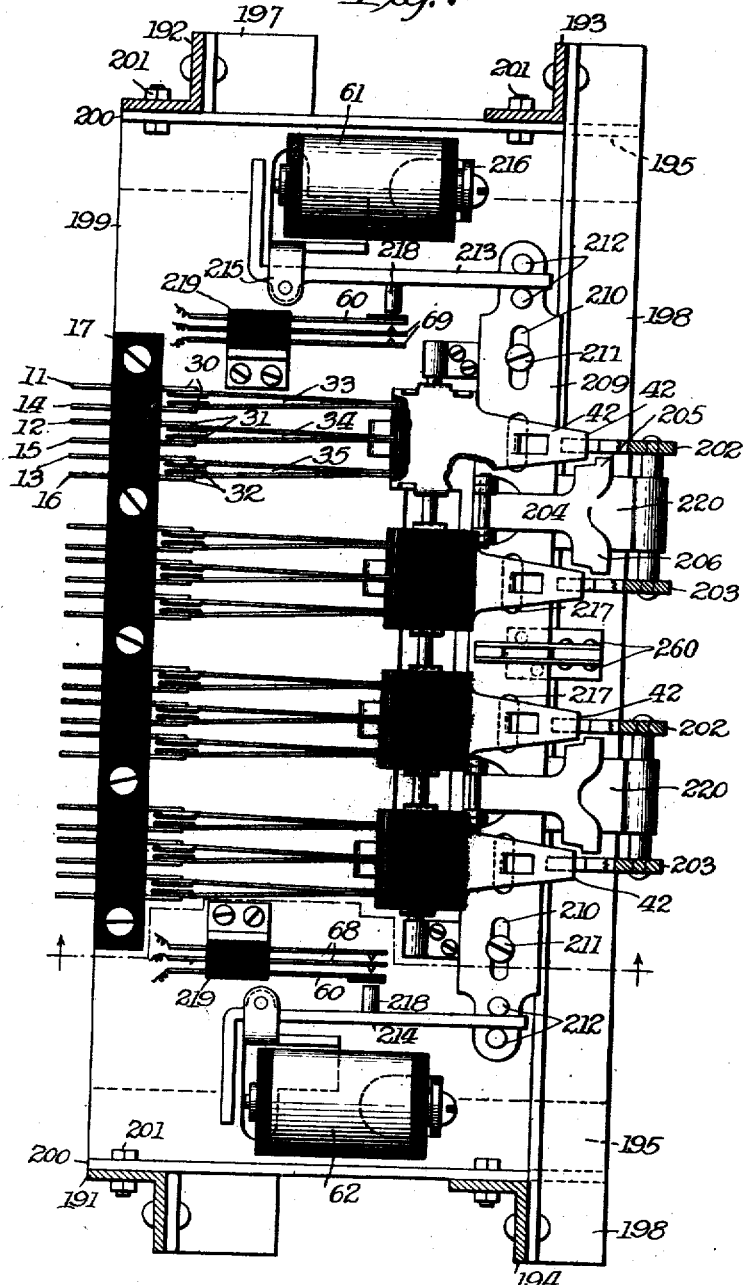

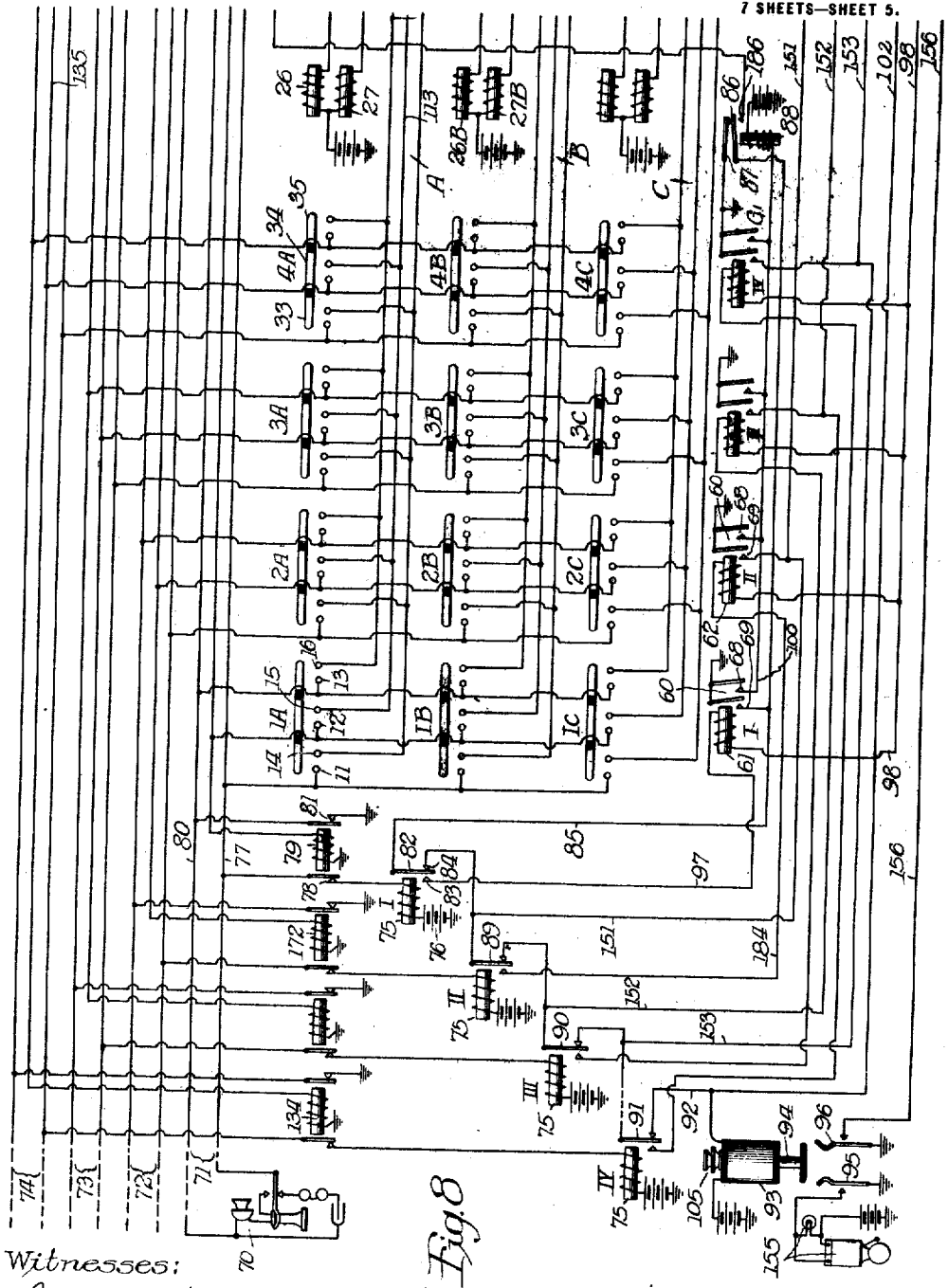

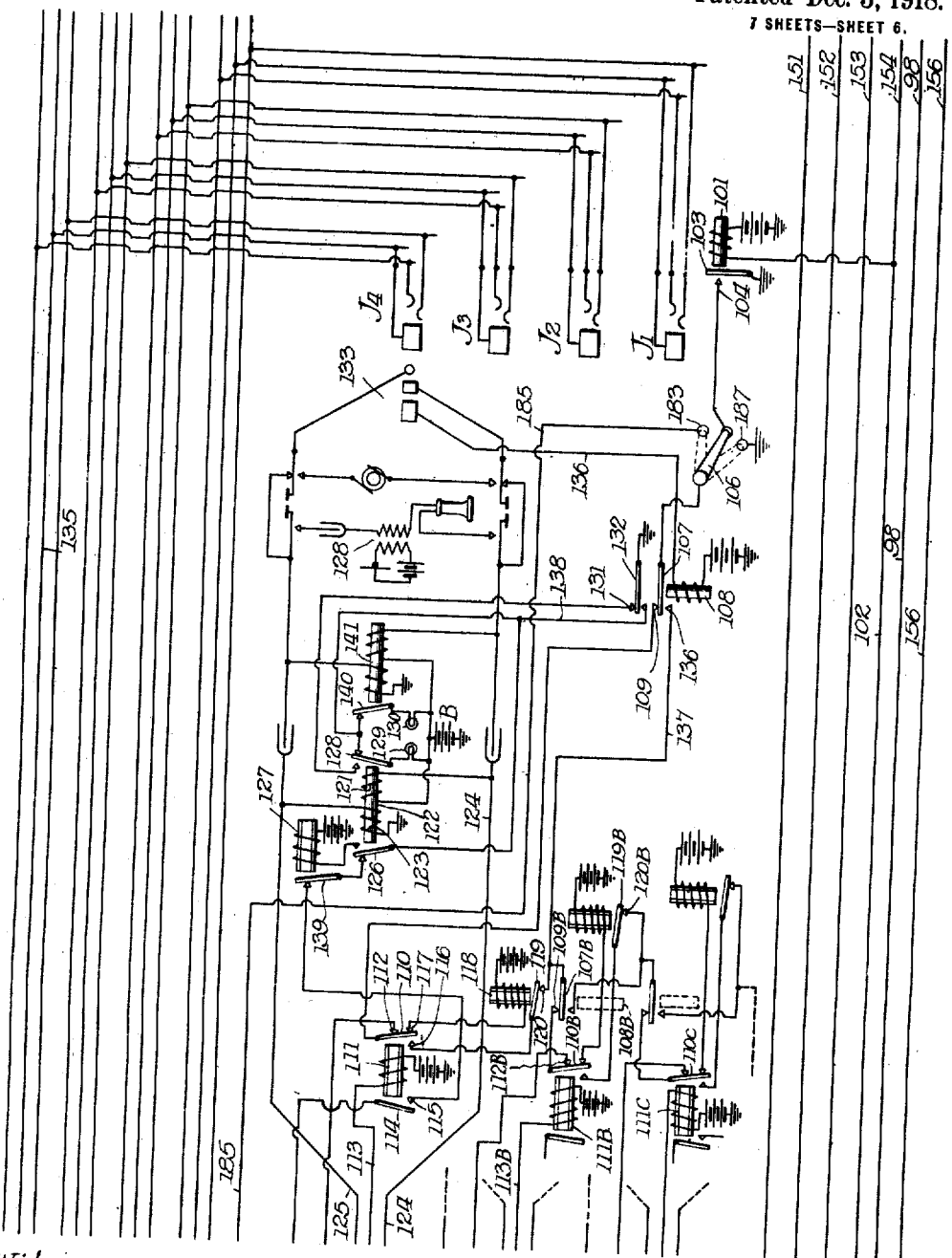

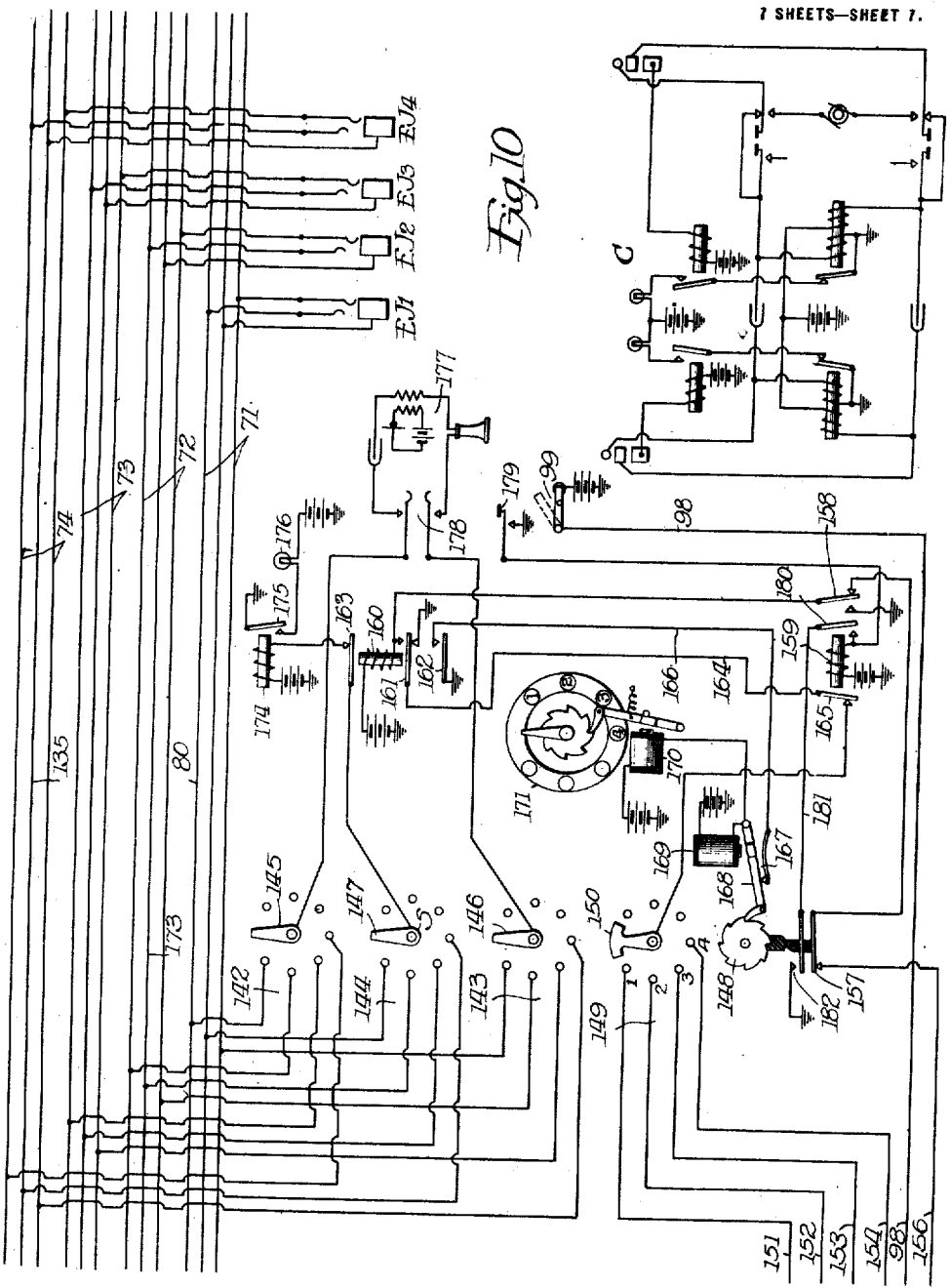

HARRY G. WEBSTER, OF CHICAGO, ILLINOIS.

SELECTOR-SWITCH.

1,286,855.   Specification of Letters Patent.   Patented Dec. 3, 1918.

Application filed September 4, 1915. Serial No. 48,960.

*To all whom it may concern:*

Be it known that I, HARRY G. WEBSTER, a citizen of the United States, residing at Chicago, in the county of Cook and State of Illinois, have invented a certain new and useful Improvement in Selector-Switches, of which the following is a full, clear, concise, and exact description, reference being had to the accompanying drawings, forming a part of this specification.

This invention relates to improvements in electric-switch mechanisms of that general type in which a relatively-large number of contact-devices is associated with two sets of actuating-members, so arranged that any desired one of the contact-devices may be actuated by the conjoint displacement of an appropriate actuating-member of each set. As here illustrated, the invention is employed as a line-switch or trunk-finder in a telephone-exchange system, but it is obviously adapted for other uses.

The principal object of this invention is to provide a selector-switch mechanism of the character above indicated, in which the circuit-terminals may be relatively-rigid contact pieces assembled in removable banks relatively distant from the actuating-bars or shafts. Another object is the provision of a mechanism such that connection between incoming and outgoing line-terminals may be effected by the simultaneous movement of the appropriate pair of actuating-members. Further objects of the invention consist in the provision of means for preventing actuation at any one time of more than one switching-device for any one line or trunk, in the provision of improved means for restoring the switching-devices to normal, and in the provision of a mechanism characterized by actuating-bars or shafts less in number than the line or trunk-circuits controlled thereby.

Other objects and advantages of the invention will appear as this description progresses.

In previous switching-mechanisms of the general type above specified, as, for example, in that disclosed in United States Patent No. 1,139,722, issued to J. N. Reynolds on May 18th, 1915, sets of intersecting bars, one for each incoming and one for each outgoing line, are provided, together with groups of resilient metal strips called contact-sets, located at or adjacent to the points of intersection of the bars. The arrangement is such that any contact-set is capable of operation upon conjoint displacement in definite order of the two bars which intersect in the locality of that contact-set. The contact-sets are maintained actuated by the continuing displacement of the last-actuated one of the two bars, and are restored to normal by their own resiliency on the release of the last-actuated bar.

As contrasted with this arrangement, I do not employ the self-restoring contact-sets, but instead provide switching-devices adapted to be adjusted and remain in either of two alternate positions. Each incoming line is provided with as many of these switching-devices as there are outgoing lines; or, conversely, each outgoing line is provided with as many of these switching devices as there are incoming lines. For one group of lines, which may be either the incoming group or the outgoing group, I provide bars or shafts, one for each line, adapted, when actuated in one direction, to coöperate in the actuation of one of the switching-devices pertaining to its line; and when actuated in the opposite direction to restore any previously-actuated one of said switching devices. For the other group of lines, outgoing or incoming, as the case may be, I provide movable members less in number than the lines in said group, displaceable under control of the individual lines of the group to coöperate with one of the bars or shafts first mentioned in causing actuation of that particular switching device corresponding alike to that line controlling the movable member and to that line to which the actuated first-mentioned bar or shaft pertains. The movable members may be in the form of bars or plates, and each carries engagement pieces corresponding in number to that of the lines to which the first-mentioned bars or shafts pertain. The movable member carrying the engagement-pieces is adapted for adjustment on energization of any one of a plurality of electro-magnets corresponding each to a different line, its adjusted position being different in the case of each line. The engagement-pieces are normally out of engagement, but on adjustment of the movable member are each brought to position to coöperate with one of the first-mentioned bars or shafts in causing the actuation of one of the switching-devices corresponding to the line whose electro-magnet has been energized. Following the actuation of the switching-device, the actuated bar or shaft and the movable member carrying the engagement-pieces both restore to their normal position, while the switching-device remains in its actuated position.

The switching-device which I employ may be any suitable type of non-restoring switch. In the form I have illustrated the switching-devices comprise groups of short, relatively-rigid terminal-strips, mounted side by side in a row or bank distant from the bars or shafts. Associated with these terminals are groups of bridging contact-members or brushes, normally out of engagement with said rigid terminals but adapted, on actuation, to engage and electrically connect pairs of said rigid terminals. Each group of bridging contact-members is provided with an actuating handle or extension projecting to position intermediate of the point of intersection of the bars or shafts with the movable members, but in position for actuation by an engagement-piece pertaining to its respective line.

By thus locating the contact-members of the switching devices at a distance from the bars or shafts I secure permanency of contact adjustment, ease of accessibility, and more satisfactory electrical contact than has heretofore been possible in selector switches of this general type. In the preferred form here described any one of the switching-devices may be actuated through the conjoint displacement of a bar or shaft, and a movable member carrying the engagement pieces, regardless of the sequence in which the displacement occurs. This is accomplished by making the engagement-pieces as well as the engaging surfaces of the bars or shafts, of such formation that the handle or extension of the switching-device will be engaged and actuated by the engagement-piece in its final actuated position regardless of the order of displacement. As a result I secure great positiveness of operation and great flexibility in the matter of controlling circuits which may be employed. As here illustrated, the controlling circuits are such that the displacement of the movable members occurs simultaneously with that of the bar or shaft under one condition of use, and under other conditions of use may occur in either order of succession.

For a more complete disclosure reference is now made to the accompanying drawings, in which—

Figure 1 is an elevation, with certain parts broken away, illustrating the mechanism of one embodiment of my invention;

Fig. 2 is a plan view of the mechanism of Fig. 1 taken on line A—A looking in the direction of the arrows;

Figs. 3 and 4 are details of the mechanism of Figs. 1 and 2;

Fig. 5 is an elevation in partial cross-section illustrating a modified form of the mechanism of my invention;

Fig. 6 is a detail of the mechanism illustrated in Fig. 5; and

Fig. 7 is a plan view of this mechanism looking in the direction of the arrows on the line B—B.

Figs. 8, 9 and 10 together constitute a diagram showing in detail the electrical controlling circuits and mechanism of the embodiment of my invention as a line-switch or trunk-selector in a telephone-exchange system.

The switching-mechanism shown in Figs. 1 to 4 has a frame-work built up of the four angle-iron posts or pillars 1, 2, 3 and 4, which are connected at top and bottom in a sidewise direction by the angle-bars 5, 6, 7 and 8. The angle-bars 6 and 7 are connected by a number of plates 9, and the angle-bars 5 and 8 at the bottom of the frame are connected by a similar number of plates 10, which are shown more clearly in Fig. 2. The plates 9 may be combined into a single plate for protecting the switching mechanism from dust, moisture, and the like.

In Figs. 1 and 2 I have illustrated switching-mechanism for four incoming lines and for three outgoing lines. The incoming lines, which may be telephone lines, or the like, are arranged vertically, that is to say, they are multipled vertically. The outgoing lines, which may be trunk-lines, are arranged horizontally, that is to say the contacts are multipled horizontally. The incoming-line terminals 11, 12 and 13 are arranged alternately with outgoing-line contacts 14, 15 and 16, and in this manner are mounted in blocks of insulation 17, secured to removable plates 19, which in turn are mounted upon angle-bars 20 and 21, secured to the uprights 2—3 and 1—4, respectively. The edges of the plates 19 are slitted, and lugs are struck up from the slit portions to form retaining lugs 22, as shown in Fig. 3. The plates 19 may be maintained in proper position by cotter-pins 23, which pass through registering apertures in the plates 19 and the side angle-bars 20 and 21. It can be seen that the plates can be slid out from the racks to make inspection or repairs to the switching-devices. When the plates 19 are shoved back into place, they are stopped by abutment-members, such for instance, as the pin 24, which is mounted on the angle-bar 21, or the angle-brackets 25, which support the restoring magnet 26. Above the incoming and outgoing-line terminals of each set of switching-devices dummy or dead contact pairs 30, 31 and 32 are mounted. When the switching-mechanism is in non-connecting position the dead contacts 30, 31 and 32 receive the split spring-arms 33, 34 and 35 of the non-normaling switching devices. The split arms 33, 34 and 35, which are built up of strips of spring metal secured in a block of insulation 36, are adapted, when moved to their actuated position, to interconnect the contact-pairs 11—14, 12—15 and 13—16. The block of insulation 36, which bears the bridging arms, is mounted for rotation or oscillation upon a bearing or saddle-member 37, which is stamped out of sheet metal. The sheet-metal saddle 37 has downwardly-bent lugs 38 for forming the bearings of the saddle upon the bearing-rod 39, which is held by suitable spring clips 40 and 41 upon the base-plate 19. The yoke 37 is provided with an actuating tail or handle 42, by means of which the same is oscillated. A pair of stops or lugs 43 and 44 are stamped from the metal, these stops preventing excessive movement of the saddle-member and thus preventing the switching-devices from being moved too far in either direction of movement. The saddle 37 preferably has a number of ears 45 bent up from the edges in order to embrace the insulating block 36. The tail or handle-member 42 of each one of the switching-devices extends beneath a common operating bar or plate 46, which is provided with pairs of spurs 47 and 48 facing toward each other and having their upper edges at a distance below the lower surface of the bar 46. These spurs 47 and 48 lie directly back of the handle 42 of the non-normaling switch-devices. The bar 46, which bears the spurs 47 and 48, is supported by radial arms 49, which are secured to the shaft 50. The shaft 50 is supported in suitable bearings 51 and 52, and is adapted to be oscillated by the armature-member 53, which is subject to the influence of the magnets 26 and 27, which are related to the outgoing lines. The magnet 26 is adapted to swing the armature 53 in a counter-clockwise direction, as viewed in Fig. 1, while the magnet 27 tends to turn the shaft in the opposite direction. A pair of springs 54 and 551 bear upon a cam extension 561 and tend to bring the shaft 50 and the connected mechanism to the neutral position, as shown in Figs. 1 and 2. When the restoring magnet 26 is energized the bar 46 is depressed and strikes the tail 42 of any of the non-normaling switching devices to move the contact-arms 33, 34 and 35 from the circuit closing position, where these arms rest upon the dead contacts 30, 31 and 32. When only the connecting magnet 27 is energized no movement of the switching-devices is thereby caused, inasmuch as there is no direct connection between the bar 46 and the handles or tails 42 of the switching-devices.

In order to secure a connection between the operating and restoring bar 46 and the handles 42 of the respective switching-devices, I provide an operating link 55, which is common to the tails 42 of two adjacent switching-devices. On account of its serving a plurality of switching-devices, I choose to designate this member as a multiple operating link. The multiple operating link 55 is pivoted at one end to a vertical oscillating bar 56, which has a bearing at 57 in top plate 9, and a bearing 58 in bottom plate 10. The multiple operating link 55 normally stands in neutral position between the spurs 47 and 48, so that movement of the bar 46 does not affect the link 55. The bar 56 is normally held in neutral position by a pair of springs 59 and 60, which bear against the flat portion of the bar 56, as shown at the top of Fig. 1. The bar 56 is preferably made of T-shaped material, so as to provide suitable means for attaching the various operating links, and the other mechanism connected to these vertical bars. Each vertical bar 56 is subject to the action of a pair of electromagnets 61 and 62, having an armature-member 63 connected to it and lying between the two electromagnets. The electro-magnet 61 is connected to one of the incoming lines, and the electromagnet 62 is connected to another incoming line. Each magnet can exercise a control over the common operating link 55.

The outer end of the operating link 55 is formed into a broad plate 64 having sharp edges on each side, so that the same may coöperate with the inclined faces of the spurs 47 and 48, which are connected to the operating and restoring bar 46.

The relation of the plate 64 and the spurs 47 and 48 is shown in Fig. 4. The edge of the handle or tail 42 of each of the switching-devices is provided with a small, upturned lug 66 adjacent the plate 64. The lug 66 projects through an opening 67 in the actuating and restoring bar 46, in order to prevent the sharp-edged plate 64 from being thrust between the handle 42 and the bar 46.

It will be apparent from the above construction that the operation of a particular switching-device to close circuit is dependent upon the movement of the cross-bar 46 upward, and movement of the multiple operating link 55 sidewise. It is unimportant which of these movements occurs first, as either device may first be operated or they may be operated simultaneously. If the operating-bar 46 is first operated the operating link will then wedge between one of the spurs 47, 48 and the tail or handle 42 of one of the switching devices, and will move the switching-device to circuit-closing position.

The line-magnets 61 and 62, which operate the controlling-bar 56, control contact-pairs 68 and 69, respectively. These contact-pairs are adapted to be closed by movement of the normaling springs 59 and 60, which are rocked when the magnets 61 and 62, respectively, are energized to move the controlling-bar 56 and the operating links 55 connected thereto.

I shall now describe, with the aid of the diagrams of Figs. 8, 9 and 10, the preferred form of circuit arrangement for use in connection with the switching-mechanism above described.

The sub-station instruments shown diagrammatically in Fig. 8 at the station 70 are connected to one of a number of lines that lead from various sub-stations to a central exchange office, the circuits of which appear in Figs. 8, 9 and 10. I have shown in this diagram four incoming lines 71, 72, 73 and 74. Each of the lines is provided at the central station with a line relay 75, which is connected on one side to the common grounded battery 76, and on the other to the sleeve side of the line through the cut-off contact 78 of the cut-off relay 79. The tip side of the line 80 is connected through the contact 81 to ground. It can now be seen that, when the subscriber at the sub-station 70 closes the line-circuit by bridging the telephone instrument across the line, the line relay 75 will be energized by current flowing from the battery 76 through the cut-off contact 78 over the sleeve side of the line 77 through the sub-station instruments and back to ground over the tip side of the line through the cut-off contact 81. The armature 82 of the line relay 75 is normally connected by means of the wire 85 to the armature contact 86, which rests against the grounded back contact 87 of the group-controlling relay 88. The armatures 82, 89, 90 and 91 of the line relays of the group of lines are normally connected in a closed controlling circuit, which may be traced from ground $G^1$ contact 87 through the armature contact 86 of the relay 88, wire 85, armature 82 of the line relay 75 of line 71, and then through the back contact of each relay to the succeeding armature-contact, to wire 92, and thence in parallel through starting relay 101 by way of wire 102 and through the time-limit relay 93 to common grounded battery. When the line-magnet 75 of line 71 is energized, the armature 82 is drawn against the front contact 83, thus breaking the normally-closed circuit for the time-limit relay 93, which will retain its plunger 94 in raised position for a predetermined length of time after the circuit is broken. If this length of time is exceeded the plunger 94 will drop and will close the contacts at the springs 95 and 96 to set into action alarm-mechanism and auxiliary rectification apparatus. Attraction of the armature 82 against the front contact 83 closes a circuit through the wire 97, the line-magnet 61, to the common battery-wire 98, through the main battery switch 99, to the common grounded battery.

Assume that the magnet 61, which is energized over the above-traced circuit, is that shown in the lower right-hand corner of Fig. 1 and of Fig. 2. The controlling-bar 56 is rotated in a counter clockwise direction to move the multiple operating links 55 into position to actuate any of the non-normaling switching-devices which are multipled to the terminals 11, 12 and 13 of line 71. As the controlling bar 56 is moved by the magnet 61, the contacts 68 and 69 will be closed, thereby placing ground by means of contact 69 and the grounded spring 60 upon the wire 85 and by contact 68 upon the wire 100, which is connected to the group-controlling-relay 88, energizing said relay 88 and moving the armature from contact with the grounded spring against its front contact to make the energization of the trunk connecting magnet dependent upon energization of the line magnet as will be later described. The magnet 61 is locked up over the circuit closed at the grounded contact 60, wire 85, armature 82 of the line relay 75, front contact 83, wire 97, winding of the relay 61, and battery wire 98. The normally-closed chain circuit which is formed through the armatures 82, 89, 90 and 91 and serves as part of the circuit of the line magnets 61—62, serves also a part of the normally-closed circuit of the outgoing lines group starting relay 101 (see Fig. 9) which is connected by wire 102 to the wire 92 and then through the series chain circuit to ground. When the armature 82 of the line magnet 75 is attracted, the circuit of both relays 93 and 101 is broken. The relay 101 immediately releases its armature 103 to make contact with the back contact 104, but the relay 93, being controlled by an adjustable time-limit mechanism 105, does not close its circuit at once. When the relay 101 is deënergized by operation of a line-magnet, the grounded armature 103 closes a circuit for the connecting magnet 27 of the first outgoing-line circuit which is not busy. This circuit may be traced from the grounded armature contact 103, back contact 104, manual controlling switch 106, armature contact 107 of the busy trunk relay 108, back contact 109, armature 110 of the private trunk relay 111, through the back contact 112, through the connecting magnet 27, and to grounded battery. Assume that the connecting magnet 27 shown in Fig. 8 is the one shown at the upper right-hand corner in Fig. 1 and in Fig. 2. Energization of this magnet swings the bar or shaft 50 about its axis in a clockwise direction, raising the spur 47 with it and swinging the blade or plate 64 of the multiple operating link 55 upward with it and thereby engaging the handle or tail 42 of the adjacent switching-device, which, in the diagram of Fig. 8, is the one in the upper left-hand corner. The bridging spring contact-pieces 33, 34 and 35 then close the contact pairs 11—14, 12—15 and 13—16 to connect the incoming line 71 with the outgoing line, in this case the cord-circuit A. The cutoff-relay 79 for the line 71 is energized to disconnect the line from the line-relay 75 over the following circuit: from ground at the terminal of relay 79, through the winding of the relay 79, contact 12 in the switching-device 1^A, bridging contact 34, contact 15 of the private wire 113, through the winding of the private trunk relay 111 to grounded battery. Energization of the trunk private relay 111 partially prepares a circuit for the restoring magnet 26 by closing the armature 114 against the front contact 115, and at the same time draws the other armature 110 against the front contact 116, thereby breaking the circuit for the connecting magnet 27 and for the guarding relay 118, which was energized simultaneously with the connecting magnet 27. The function of the guarding relay 118 is to break in forward direction the circuit that is formed for the operating relay 26 of the different switching devices. This is done so that switching over of the control circuit from one trunk to the next will occur a brief period after the actual connection between the last trunk and the incoming line is made.

The holding up of the armature 119 for a brief period produces a distinct pause between the connection of an incoming line with an idle trunk and the connection of another incoming line with the next idle trunk, thus positively preventing simultaneous connection of two lines to a single trunk and preserving an orderly sequence under all conditions.

The relay 118 is slow-acting and releases its armature 119 to close contact with the back contact 120 only after the armature 110 of the private relay 111 is attracted. This allows sufficient time for the non-normaling switching devices 1^A, 2^A, 3^A, etc., to operate and the various parts to be brought to the normal condition before the operating circuit for one of the circuit-connecting magnets 27 can again be closed. This allows the line-magnet 61 to release and the multiple operating link which has been employed to effect the connection to be restored to its neutral or normal position, so that if the next calling line 72 has as a line-magnet the magnet 62, it will be able to command the controlling bar 56 and the multiple operating link 55 connected thereto.

As soon as the switching device is moved to the connecting position battery is fed out over the trunk to the substation by way of the following circuit: ground at battery B, winding 121 of the supervisory relay 122, sleeve side 124 of the trunk A, through the bridging contact 33, sleeve side of the line 77, through the sub-station instruments at the sub-station 70, back over the tip side of the line 80, through the bridging contact 35, over the tip side of the trunk 125, through the winding 123 of the supervisory relay 122, and to ground. The supervisory relay 122 is thereby energized and the release circuit which is formed through its armature 126 is thereby broken and the armature 126 connected by way of front contact to the circuit of the release-retarding relay 127. At the same time the armature 128 closes a circuit by way of its front contacts and through the back contacts 131 of the armature 132 of the busy trunk relay 108 for the lamp signal 129, which serves as a line signal or calling signal. As soon as the line signal 129 is energized the operator connects her telephone set to the trunk in the well-known manner, and upon receiving an order for a connection from the subscriber at the sub-station 70, completes the connection by inserting the plug 133 in the multiple jack of the desired line.

Assume that the connection desired is with the line 74. The operator inserts the plug 133 in the jack J^4 and applies ringing current in the well-known manner. Insertion of the plug 133 closes a circuit for the third wire relay 108 of the trunk and at the same time energizes the cut-off relay 134, which is connected in the third wire 135 of that line. This circuit may be traced from the ground at battery, through the winding of the busy trunk relay 108, third strand of the cord 136, through the plug 133 and the jack J^4 to the third wire 135 of the line, through the cut-off relay 134 and to ground.

When the busy trunk relay 108 is energized, the chain circuit is closed through the armature 107 of the relay 108 to the front contact, which is connected by wire 137 to the armature 107^B of the busy trunk relay 108^B shown in dotted lines in Fig. 9. Thus, the energizing circuit for the connecting relay 27^B of the trunk B is prepared, so that the next incoming line upon calling will be connected to the trunk line B in case the trunk line A is still busy at that time. As soon as the conversation is completed between the subscriber connected to the line 71 and the subscriber connected to the line 74, the non-normaling switching device which serves to connect the two lines will be restored to normal by energization of the restoring magnet 26.

The circuit for the restoring magnet 26 is partially prepared by movement of the armature 132 of the busy trunk relay 108 against its front contact, placing ground upon the wire 138 and thereby energizing the release retarding relay 127. The circuit for the relay 127 remains closed so long as the sub-station instruments are bridged across the line 71, but when the receiver is placed on the hook the supervisory relay 122 is deënergized and the circuit of the release retarding relay 127 is broken. The relay 127 is made slow-acting so that if the subscriber at the sub-station 70 moves his receiver-hook up and down to attract the attention of the operator, or if the switch-hook be moved accidentally, restoration of the switching-device will not be caused immediately. The magnet 127 holds is armature 139 for a short time after the circuit of the magnet is broken, but as soon as the armature 139 drops against the back contact a circuit for the restoring magnet 26 is formed as follows: ground at armature contact 132 of the busy trunk relay 108, front contact, wire 138, armature contact 126 of the supervisory relay 122, back contact thereof, armature 139 of the release retarding relay 127 and back contact thereof, through the front contact 115 and armature 114 of the trunk private relay 111, through the winding of the restoring magnet 26, to ground at battery. When the restoring magnet 26 is energized the shaft 50 bearing the actuating and restoring bar 46 is swung in a counter-clockwise direction, as viewed in Figs. 1 and 2, to depress the handle 42 of the switching-device to destroy the connection and restore the switching device to normal. The relay 111 is made slow-acting so that the circuit for the restoring magnet will remain closed at the contacts 114 and 115 until complete restoration of the switching-device is made, even though the circuit of the relay 111 is broken during such operation. When the supervisory relay 122 releases its armature 128, the lamp signal 129 is energized and, as soon as the called subscriber breaks his line circuit the supervisory relay 141 releases its armature 140 and closes a circuit for the supervisory signal 130.

The operator, upon seeing the two lamp signals lighted, removes the plug 133 from the jack, thereby deënergizing the busy trunk relay 108 and the cut-off relay 134. Both lines and the trunk are then free for further selection.

In case the trunk line A were busy when the subscriber at the sub-station 70 called for a connection, operation of the line relay 75 to break the normally-closed controlling circuit would result in deënergization of the group-control relay 101 to place ground upon the contact 104, and, as the trunk A is busy, the ground would extend through the armature 107, front contact 136, through the wire 137, to the armature 107$^B$ of the busy trunk relay 108$^B$ of the trunk B; thence to the back contact 109$^B$, armature 110$^B$ of the trunk private relay 111$^B$, through the connecting magnet 27$^B$, and to ground at battery. It can thus be seen that, through the chain circuit established by the relays 108, the starting circuit of the grounded contact 103 is passed successively on from the trunks which have their calling ends busy to a chain circuit controlled by the trunk private relays 111, which chain circuit is controlled in accordance with the busy condition of the answering ends of the trunks.

In case the trunk line A had been selected but the plug 133 had not been introduced, the starting circuit would extend from the grounded contact 103, through the armature 107 of the relay 108, to the armature 110 of the relay 111, through the front contact 116, through armature 119 and back contact 120 of the guarding relay 118, to the armature 107$^B$ of the busy trunk relay 108$^B$, and thence by way of armature 110$^B$ to the connecting magnet 27$^B$. Thus, if either the answering or the calling end of the trunk circuit be busy, the starting circuit is extended to the first trunk which has both ends thereof idle.

Assume that two lines call for a connection in close succession and that these lines are 71 and 72. Assume that the receiver of line 71 is first raised. Line relay 75 is operated to break the normally closed chain starting circuit through the relay 101 at the armature 82 and back contact 84. This chain circuit remains temporarily open. The line magnet 61 is next energized to perform a part of the selecting and connecting operation. Then the connection through the operating or connecting magnet 27 is formed and energized. This operates the connecting magnet 27 of the first idle trunk. The succession or order of selection of the trunks is determined by the trunk selection controlling chain circuit which has previously been traced through the back contacts of the armatures of relays 111, 111$^B$, and 111$^C$. Operation of the appropriate connecting magnet 27 moves the connecting switch member as 14, 15, 16 to connect the corresponding trunk such as A with the line 71. At the instant that this connection is made the corresponding cut-off relay 79 is energized as previously described. The energization of the cut-off relay 79 of the connected line 71 is in series with the energization of the private trunk relay 11. The cut-off relay 79 cuts off the control of the particular calling line 71 over the normally closed chain starting circuit and by re-completing the circuit and conditioning it for a second operation it restores control of the circuit to each and all of the incoming lines.

The relay 11 cuts off the control of the normally closed starting circuit over the trunk corresponding to said relay and by extending the normally open chain selecting circuit, this relay places the next idle trunk under the control of that starting circuit. The conjoint operation of these circuits is to secure the desirable result of pre-selecting the next idle trunk so that it will be seized by the next first calling line. Hence the pre-selection of the next idle trunk will be accomplished by the time that the chain starting circuit is closed. The chain starting circuit is closed at 82—84 by deënergization of the corresponding line relay 75 when its circuit is broken by the cut-off relay 79.

The above operation of breaking the normally closed starting circuit, operating the line magnets, the connecting magnet and the cut-off and private trunk relay is all performed almost instantaneously and as soon as these operations are performed the chain starting circuit is in condition for operation by the next calling line, which we have assumed in this case to be line 72.

Hence if the time between the initiation of a call by line 71 and the initiation of a call by line 72 is greater than or equal to the time required to make the connection between line 71 and the first idle trunk, regular sequence is secured. If line 72 initiates the call before line 71 has been connected to an idle trunk it awaits the closing of the chain starting circuit and operates thereafter to open said starting circuit to obtain a connection with the first idle trunk.

In the event of any two or more lines initiating a call simultaneously the lines are able to exercise control over the starting circuit in the order in which their line relays 75 are arranged in the series.

Assume that lines 72, 73 and 74 all call exactly simultaneously. Line 72 having its line relay 75 arranged near the ground wire 85 completes its operation of selecting the first idle trunk and connecting thereto and then closes the starting circuit. Lines 73 and 74 meanwhile await their turn to make a selection and connection as they cannot obtain the ground connection 85 for energizing their line relays 61 or 62 until the prior line in the series has made its connection with an idle trunk.

In case line 71 should initiate a call while line 72 is starting to make a connection with a trunk no interruption can possibly result as the energization of the line relay 62 which corresponds to the line 72 provides a ground forming a locking circuit for the magnet 62 independently of the ground connection 85. This locking circuit is only released by deënergization of the magnet 75 when the cut-off relay 172 is operated. Thus it can be seen that these serially related line magnets which control the normally closed starting circuits are so related and organized that one of the series cannot arbitrarily assume precedence over another one of the series either earlier or later in the series. Consequently it is impossible for more than one bar of a switching set to be operated at a time.

*Emergency or rectification mechanism.*

An important part of my invention is an emergency or rectification device for automatically repairing or rectifying the circuits so that normal operation may be resumed after a fault develops in any part of the apparatus. The incoming lines 71, 72, 73, 74, etc., are extended to an emergency position, 70 shown at the extreme right of Fig. 10, and are terminated in jacks EJ¹, EJ², etc. The lines are also multipled to a series of switch bank contacts, 142, 143 and 144 for the tip and sleeve and third wire of the respective lines. These contacts are adapted to be engaged by the wiping-contacts 145, 146 and 147, secured to a common shaft and adapted to be moved in step-by-step manner, as by the ratchet-wheel 148. On the same shaft with the contacts 145, 146 and 147 is a broad wiping-contact 150, adapted to engage the contacts 149, which are arranged in a suitable bank adjacent thereto. These contacts 149 are connected by the wires 151, 152, 153 and 154 to the back armature contacts of the line relays 75 of the lines 71, 72, 73 and 74, respectively.

It can be seen that the normally-closed series circuit from grounded contact 87 through the armature 86, wire 85, then through the armatures of the various line relays in series, to the wire 92 and in parallel through the time-limit relay 93 and the starting relay 101, depends for its action upon a break in the circuit to deënergize the starting relay and a make at the armature where the break occurs to energize a line magnet which, during the act of selecting a switch, locks itself up until the corresponding cut-off relay of the incoming line is energized by the act of making connection from an outgoing or trunk line to that incoming line.

Assume that the line 72 is calling and that its line relay 75 is energized to attract the armature 89, but that the operation is incomplete to the extent that, although the back contact of the armature is open, the front contact is not closed. In this condition the entire group of lines would be incapacitated and no selection could be made by any line of the group. In this condition the time-limit relay 93 drops its plunger 94 to close the contacts 95 and 96, thereby energizing the alarm signals 155 and closing a circuit through the wire 156, through the normally-closed contact 157, back contact of the armature 158 of relay 159, through the winding of relay 160, and to grounded battery. The starting relay 160 for the step-by-step switch-mechanism is thereby energized to attract its armatures 161, 162 and 163. The armature 161 closes a test-circuit through the wire 164, armature-contact 165 of the relay 159, to the test-wiper 150. The armature 162 closes a starting-circuit through the wire 166, back contact 167, vibrating armature 168 of the switch-stepping magnet 169, through the winding of the magnet 169, to grounded battery, to initially energize the stepping-magnet to place the line-wipers and test-wiper 150 upon the first or initial contact. The stepping-magnet 170 of an indicator 171 is connected in parallel with the magnet 169. The indicator 171 is a step-by-step indicator, which keeps pace with the position of the switch-mechanism. This indicator is placed in suitable position in front of an operator at the position containing the multiples $EJ^1$, $EJ^2$, etc.

The initial step of the switch-mechanism S breaks the contact 157, which was in the energizing circuit of the switch-starting relay 160, thereby placing the continued energization of the relay upon the grounded condition of the contacts 149 in the testing-circuit. That is to say, the stepping-relay 169 moves the contacts 150 to test back through sections of the series starting circuit to the ground $G^1$. The testing-circuit may be traced as follows: from grounded battery through the winding of relay 160, armature 161, wire 164, armature 165 of the relay 159, testing contact 150, through the first contact 149, over the wire 151, to the back contact 84 of the armature 82 of relay 75, through wire 85, through the contacts 86 and 87, to ground at $G^1$. If the back contact 84 is closed the testing relay 160 remains energized and the wiper 150 is stepped forward to the next contact 149 to test over the line 152 to the back contact of armature 89, back contact 84, to ground at $G^1$, as previously traced. If, however, as above supposed, the armature 89 has been withdrawn from its back contact and has failed to make contact with the front armature contact, the above circuit will be broken and the testing-relay 160 deënergized, the wiper 150 remaining upon the second contact 149 and the indicator 171 pointing to the numeral corresponding to the line whose line-relay failed to operate correctly. The wipers 145, 146 and 147 have been brought upon the contacts 142, 143 and 144 of the line 72, and the cut-off relay 172 of the line 72 is energized over the third wire 173, second contact 144, wiper 147, armature 163 of the relay 160 which is now deënergized, through the winding of the line-signal relay 174, which attracts its armature 175 to close a circuit for the signal lamp 176. The signal lamp is thus energized only when the wipers of the switch S have been brought upon the contacts of a disabled or abnormally-functioning line. The operator at this position may connect her telephone set 177 to the selected line by means of a suitable key 178 and may ascertain the connection desired by the calling subscriber, and complete the connection upon her multiple board by a suitable cord-circuit C. Or she may ascertain the number of the line from the indicator 171 and plug into the corresponding multiple jack EJ to ascertain the connection desired by the calling subscriber.

The operation of the automatic switching-mechanism S in finding the disabled line or the point in the series starting circuit at which the break occurred, places a suitable ground upon the terminals of the break, so that other incoming calling lines may have access to selectable trunks or outgoing lines during the time that the disability exists. When the armature 161 of the relay 160 drops back, it places ground upon the test-wiper 150 and thence over the wire 152 to the armature 90 of the next line relay to restore the series starting-circuit for the remainder of the group of lines.

If the break in the series starting-circuit was due to the improper action of one of the line relays, energization of the corresponding cut-off relay will restore the line relay to normal, deënergized condition, thus closing the circuit. The operator at the emergency position notes the number of the disabled line and reports the same so that repairs may be made at once. The switching-mechanism S is restored to normal only when the operator depresses the restoring key 179. This energizes the relay 159, which locks up over the following circuit: grounded battery, through the winding of the relay 159, front contact, armature 180, wire 181, off-normal contact 182, to ground. The energization of the relay 159 closes an energizing circuit for the starting relay 160 from grounded contact to the armature 158 of the relay 159, through the winding of the starting relay 160, to grounded battery. And the relay 160 closes the stepping or motor circuit for the switch to bring the switch back to normal position, where the off-normal contact 182 is broken and the normal contact 157 is established. The switch is then ready for another selection.

I find it convenient to employ this selective mechanism for handling the entire volume of switching during periods when the switching load is light, such as at night and on holidays. When the system is to be thus employed to make connections between subscribers at the emergency operator's position, the main battery switch 99 is opened to disconnect the line-magnets 61, 62, etc. As a result the controlling bar 56 is not shifted and the multiple operating link is not placed in position to operate one of the switching devices for making a selection. As no selection, and connection with a trunk is made, the cut-off relay of that line is not energized and the break in the starting-circuit continues to the point where the time-limit relay 93 releases its plunger to start the selecting switch S in a search for the calling line. The switch, upon finding the calling line, operates the cut-off relay and extends the line to the key 178, where the operator may make connection with the calling line to ascertain the desired connection; or the operator may see the number of the calling line from the indicator 171, and may either plug in to the multiple jack of the calling line, or may apprise her assistant of the number of the calling line.

*Variation of control of the starting-circuit.*

It is to be noted that the switch 106, shown in Fig. 9, has three positions. When this switch is in the position shown in full lines, the line magnets 61 or 62 and the connecting magnet 27 operate substantially simultaneously. This produces a quick action in securing a selection and connection. When the switch is thrown to the upper position to connect the blade 106 with the contact 183, energization of the connecting magnet 27 is dependent upon prior energization of the line magnet of the calling line.

Assume that the line 72 becomes a calling line, the line relay 75 is energized to attract its armature 89 and its line magnet 62 is energized over the following circuit: ground $G^1$ contacts 86 and 87 of the relay 88, wire 85, armature 82, back contact 84, armature 89, which is now attracted, over the wire 184, through the winding of the line magnet 62, to the common battery wire 98 and thence to ground at battery. By operation of the relay 62 the controlling bar 56 is swung in a clockwise direction and the grounded contact springs 60 are connected to the wire 151 to lock the magnet 62 in a closed circuit, which may now be traced from the grounded contact springs 60 to the wire 151, armature 89, wire 184, winding of the magnet 62 and to ground at battery over the common bus-bar 98. The armature contact 60 also places ground upon the common bus-bar 100 of the group-controlling relay 88 to break circuit from the ground $G^1$ at the springs 86 and 87 and connect wire 85 to wire 185 at springs 86 and 186.

Assume that the trunk line A is not busy and is therefore in condition to be selected. The circuit for the connecting magnet 27 is then formed as follows: From common battery through the winding of the magnet 27, to the back contact 112, armature contact 110 of relay 141, back contact 109 of relay 108, to the armature 107, switch 106, contact 183, wire 185, front contact 186 of the relay 88, which is now energized, and to ground through the wire 85, armature 82, back contact 84, wire 151, to the ground spring 60 of the relay 62. It can be seen that, for this position of the controlling switch 106 the line magnet is first energized and it prepares a circuit for the connecting magnet 27 of the first idle trunk line.

When the switch 106 is placed on its bottom contact 187 the connecting magnet of the first idle trunk is energized so that the trunk is, in effect, preselected for connection with the first calling line. The circuit for the magnet 27 may be traced as follows: ground at battery, to the winding of the magnet 27, back contact 112, armature 110 of the relay 111, back contact 109 of the relay 108, armature 107, through the controlling-switch 106, to the contact 187 and thence to ground. The first calling line, which operates the starting-circuit, will then be connected to the trunk line A, which has its connecting magnet 27 energized.

In Figs. 5, 6 and 7 I have illustrated a modification of the switch in which, instead of employing rotary motion of the controlling members, I employ rectilinear motion. The switching mechanism is mounted in a framework composed of the four upright posts or pillars 191, 192, 193 and 194. The posts 191 and 194 are connected together by the angle-bar 195, the posts 191 and 192 by the angle-bars 196 and 197, and the posts 193 and 194 by the angle-bar 198. The electrical switches and circuits of the switching-mechanism shown in Figs. 5, 6 and 7 is precisely the same as that shown in Figs. 1 to 4, inclusive, this modification being merely a different mechanical manner in which to carry out the invention. The various groups of switching-terminals are mounted in a block of insulation in the manner previously described, and the non-restoring switching devices are substantially identical with those described in connection with Figs. 1 to 4, inclusive. The base-plate 199 upon which the switching-devices are mounted, is formed of a plate of sheet-metal having upturned edges 200, which are secured by suitable bolts 201 to the corner posts. The common operating bar 46 of the structure shown in Figs. 1 and 2 is replaced in this modification by a pair of bars 202 and 203, which are substantially identical and which are adapted to engage through the intervention of a suitable operating link 204, which corresponds to the operating links 55 of the previous modification. The multiple operating link 204 is provided with lateral extensions 205 and 206, which are adapted to be moved into position whereby the operating spur 207 on the operating bar 202 or 203 will engage the same and cause it in turn to engage the tail 42 of the selected non-restoring switching device. The operating bar 202 is also provided with a restoring spur 208, which is capable of engaging the tail or handle 42 of any of the switching-devices which have been moved to circuit-closing position, without the intervention of one of the operating links. The operating links 204 are pivotally mounted upon a sliding bar 209, which is adapted to be shifted bodily to one side or the other by the line magnets 61 or 62 of the incoming line circuits. This controlling bar 209 is slotted adjacent its end, at 210, to receive a headed screw 211, which maintains the bar in proper alinement. At each end of the bar a pair of pins 212 is mounted, and the end of an armature-lever 213 or 214 of the corresponding line magnet passes between these pins and serves as actuating means for the controlling bar. The armature bar 213 has its end projecting adjacent the core of the magnet 61 and is pivotally mounted upon the base-plate 199 and a suitable bracket 215, which may be formed by striking up the metal as shown in Fig. 7. The magnet 61 is also mounted upon a struck-up lug 216, so that the base-plate may serve as part of the return magnetic circuit for the magnet. The bar 209 is also slotted at 217 to receive the lug 44 for limiting the movement of the non-restoring switching-devices. The armature bars 213 and 214 are provided with suitable pins 218 for pressing the grounded springs 60 against the contact springs 68, 69, which are mounted in a block of insulation 219 upon the base-plate 199. The operating and restoring bars 202 and 203 are mounted upon the ends of pivoted bars 219 and 220. The pivoted bar 220 is mounted adjacent the restoring magnet 26, which serves to move the bars 202 and 203 downward for the purpose of restoring the switching-device that may have been in connected position. This bar 220 is pivoted on a knife-edge 221 formed on the upper edge of the angle-bar 197. An adjustable spring 222 is secured to the end of the bar 220 and serves to counterbalance the weight of the pivoted bar and the actuating bars 202 and 203. The upper bar 219 is mounted upon a similar knife-edge 223, upon which it is held by a suitable keeper-spring 224.

In this modification the incoming line magnet 61 or 62 of the calling line is first energized to place the multiple operating links between the operating spur 207 and the tails or handles 42 of the appropriate row of switching devices. Thereafter through the various starting and selecting mechanisms, the appropriate operating magnet 27 of an idle trunk or outgoing line is energized, whereby the switching-device is moved to circuit-closing position. The common controlling bar 209 is normally held in neutral position by the springs 260, and the operating and restoring bars 202 and 203 are held in neutral position by the counterbalancing spring 222 and the spring 225, which is secured to the upper angle-bar 196.

The operating circuits in which the modification shown in Figs. 5, 6 and 7 may be employed are indicated and described in connection with Figs. 8, 9 and 10.

It can be seen from the above that I have provided a switching-mechanism of compact and economical structure which is adapted for convenience and low cost of manufacture and up-keep. The contact-banks and the switching devices are readily removable for inspection or repair. The switch above described employs a minimum number of parts and the number of controlling or operating bars is less than in any previous type of switch.

Where a number of incoming lines, which may be represented by N, are to be served by a number of outgoing lines, which may be represented by M, the best arrangement that could previously be made in effecting any one of the N×M number of possible connection was to employ M plus N operating bars or devices. In accordance with my invention, the number of operating bars need only be N plus $\frac{M}{2}$ or M plus $\frac{N}{2}$.

It can also be seen that I have provided novel mechanism and circuits for preventing simultaneous operation of the switching-devices.

I have also provided a novel form of starting-circuit in the normally-closed chain circuit which is guarded by the time-limit relay, which guards the system against disarrangement.

What I claim as new and desire to protect by Letters Patent of the United States is:

1. In combination, switching devices arranged in groups of two planes, actuating means therefor comprising an operating element common to a group of devices in one plane, a multiple controlling element common to a plurality of groups of devices in another plane, and multiple operating links connecting said multiple controlling element with said operating element to actuate any desired switching-device.

2. In combination, switching devices arranged in groups in a plurality of planes, actuating devices therefor comprising an operating element common to a group of devices in one plane, a multiple controlling element common to a plurality of groups of switching-devices in another plane, multiple operating links connecting said multiple controlling element and said operating element to operate any predetermined one of said switching devices, and means to operate said operating element to restore said switching devices.

3. In combination, switching devices arranged in groups in two planes, actuating means therefor comprising an operating element common to a group of devices in one plane, a multiple controlling element common to a plurality of groups of devices in another plane, and multiple operating links connected to said controlling element and means to operate said controlling device to cause said multiple operating links to connect the operating element with any one of said group of switching-devices.

4. In combination, incoming lines, outgoing lines, switching-devices for interconnecting said lines, operating elements in one plane equal in number to the incoming lines, operating elements in another plane less in number than the outgoing lines, and means to actuate said operating elements to cause said switching-devices to make connection between any one of said incoming lines and an idle one of said outgoing lines.

5. In combination, a group of lines, a second group of lines, switching-devices for interconnecting said lines, operating elements in one plane equal in number to the first group of lines, operating elements in another plane less in number than the second group of lines, and means to actuate said operating elements concurrently to cause said switching-devices to make connection between any desired one of said first group of lines and an idle one of said second group of lines.

6. In combination, a first group of lines, a second group of lines, a switch-bank containing terminals for said lines, switching-devices for interconnecting said terminals, operating elements in one plane equal in number to the first group of lines, operating elements in another plane less in number than the second group of lines, and means to actuate said operating elements concurrently to cause said switching-devices to make connection between any one of said first group of lines and a desired one of said second group of lines.

7. In combination, a first group of lines, a second group of lines, switching-devices for interconnecting said lines, operating elements in one plane equal in number to the first group of lines, operating elements in another plane equal in number to one-half the number of the second group of lines, and means to actuate said operating elements concurrently to cause said switching-devices to make connection between any one of said first group of lines and a desired one of said second group of lines.

8. In combination, a first group of lines, a second group of lines, switching-devices not self-restoring for interconnecting said lines, operating elements in one plane equal in number to the first group of lines, operating elements in another plane less in number than the second group of lines, means to actuate said operating elements concurrently to cause said switching-devices to make connection between any one of said first group of lines and a desired one of said second group of lines, and means to actuate said first operating element to positively restore said switching-devices to normal.

9. In combination, a first group of lines, a second group of lines, switching-devices not self-restoring for interconnecting said lines, operating elements in one plane equal in number to the first group of lines, operating elements in another plane less in number than the second group of lines, means to actuate said operating element concurrently to cause said switching-devices to make connection between any one of said first group of lines and a desired one of said second group of lines, and means to actuate one of said operating elements singly to restore said switching-devices to normal.

10. In combination, switching-devices which are not self-restoring, movable bars, operating links controlled by common operation of said bars to actuate said switching-devices.

11. In combination, switching-devices which are not self-restoring, movable bars, operating links controlled by conjoint operation of said bars to move said switching-devices to closed-circuit position, and means for actuating one of said movable bars to move said switching-devices to open-circuit position.

12. In combination, switching-devices which are not self-restoring, movable bars, operating links controlled by conjoint operation of said bars to move said switching-devices from their normal positions, and electro-magnetic means for moving one of said movable bars to restore said switching-devices to normal position.

13. In combination switching devices, a set of bars movable in one direction, a second set of bars movable in another direction, operating links on one of said sets of bars, said links controlled by conjoint operation of said movable bars to actuate said switching-devices.

14. In combination, switching-devices which are not self-restoring, a set of bars movable in one direction, a second set of bars movable in another direction, operating links on one of said sets of bars, said links controlled by joint operation of said movable bars to actuate said switching-devices, and electro-magnetic means for actuating the bars of one set to restore said switching-device to normal.

15. In combination, stationary terminal pairs, switching-devices not self-restoring for each pair, a set of movable operating bars, a second set of operating bars at an angle to said first bars, and an operating link movable by conjoint operation of said bars to operate said switching-devices.

16. In combination, stationary terminal pairs, switching-devices not self-restoring for each pair, a group of movable bars, a second group of bars at an angle to said first group, and an operating link operable by conjoint operation of said bars to actuate a desired one of a plurality of said switching-devices.

17. In combination, stationary terminal pairs, switching-devices not self-restoring for each pair, a group of movable bars, a second group of bars at an angle to said first bars, an operating link on each of said second set of bars for operating a plurality of switching-devices, and means for moving the bars of said first set to restore said switching-devices.

18. In combination, a plurality of switching-devices arranged in groups and rows, an operating bar for each group, and an operating bar at an angle to said first bar for a plurality of rows.

19. In combination, a plurality of switching-devices arranged in groups and rows, an operating bar for each group, and an operating bar at an angle to said first bar for two of said rows.

20. In combination, a plurality of switching-devices arranged in groups and rows, an operating bar for each group, an operating bar at an angle to said first bar for a plurality of rows, and an operating link movable by conjoint operation of said bars to operate a desired one of a plurality of switching-devices in said rows.

21. In a telephone switch, switching-devices not self-restoring, sets of rotatable bars, said switching-devices being remote from said bars, and means for rotating a bar of each set to actuate said switching-devices.

22. In a telephone switch, sets of rotatable bars, switching-devices not self-restoring, remote from said bars, means for rotating a bar of each set to actuate said switching-devices, and means for rotating one of said bars singly for restoring said switching-devices.

23. In a telephone switch, sets of rotatable bars, stationary contact terminals remote from said bars, switching-devices not self-restoring for connecting said stationary terminals, and means for rotating a bar of each set to actuate said switching-devices.

24. In combination, sets of rotatable bars, stationary contact terminals remote from said bars, switching-devices not self-restoring for connecting said terminals, means for rotating a bar of each set to actuate said non-restoring switching-devices, and means for rotating one of said bars singly for restoring said switching-devices.

25. In combination, sets of rotatable bars, stationary contacts, switching-devices not self-restoring for interconnecting said contacts, means whereby the rotation of a bar of each set will actuate one of said switching-devices, and means for rotating the bars of one set for restoring said switching-devices.

26. In combination, sets of rotatable bars, contact terminals remote from said bars, switching-devices not self-restoring for interconnecting said contact-terminals, and operating links controlled by conjoint operation of a bar of each set in any desired order to operate one of said switching-devices.

27. In combination, sets of rotatable bars, the bars of one set being at an angle to those of the other set, stationary contact-terminals corresponding to each of said bars, switching-devices not self-restoring for interconnecting said stationary contact-terminals, operating links operable by conjoint operation of said rotatable bars in any order to actuate said non-restoring switching-devices.

28. In combination, sets of rotatable bars, the bars of one set being at an angle to those of the other set, stationary contact-terminals corresponding to each of said bars, switching-devices not self-restoring for interconnecting said stationary contact-terminals, operating links operable by conjoint operation of said rotatable bars in any order to actuate said non-restoring switching-devices, and means for actuating the bars of one set to restore said switching-devices to normal.

29. In combination, a group of lines M in number, a second group of lines N in number, a plurality of switching devices M×N in number, and operating bars for said switching-devices, said operating bars being less in number than M plus N.

30. In combination, a group of M lines, a group of N lines, switching-devices M×N in number, a group of operating bars M in number, and a second group of operating bars $\frac{N}{2}$ in number, the bars of said groups being operable conjointly to actuate a switching-device to interconnect desired ones of said lines.

31. In combination, a group of lines, a second group of lines, a plurality of switching-devices, said switching-devices being arranged in rows corresponding to the number of said first group and being arranged in tiers corresponding in number to said second group, a set of operating bars, one for each tier, and a second set of operating bars, one for a plurality of rows, said operating bars being conjointly operable to actuate said switching-devices.

32. In combination, a group of lines, a second group of lines, a plurality of switching-devices, said switching-devices being arranged in rows corresponding in number to the number of said first group, and in tiers corresponding in number to the number of said second group, a set of operating bars, one for each tier, and a set of operating bars, one for a plurality of rows, and operating links on the bars of said second set, said links being operable by conjoint operation of the bars of each group to actuate said switching-devices.

33. In combination, a group of lines, a second group of lines, a plurality of switching-devices, said switching devices being arranged in rows corresponding in number to the number of said first group, and in tiers corresponding in number to the number of the second group, a set of operating bars one for each tier, a second set of operating bars one for a plurality of rows, operating links on the bars of one set, said links operable by joint actuation of bars from each set to actuate said non-restoring switching-devices, and means to operate the bars of one set to restore said non-restoring switching-devices to normal.

34. In combination, a group of lines, a second group of lines, a plurality of switching-devices for interconnecting said lines, said devices being arranged in rows corresponding in number to the number of said first group, and in tiers corresponding in number to the number of the second group, a set of operating bars one for each tier, a second set of operating bars, one for a plurality of rows, operating links controlled by conjoint operation of said bars for operating said switching-devices, line-controlled magnets corresponding in number to the first group of lines, and line-magnets corresponding in number to said second group of lines, said line-magnets controlling the operating bars of their respective sets.

35. In combination, a group of lines, a second group of lines, a plurality of non-restoring switching-devices, said switching-devices being arranged in rows corresponding in number to the number of said first group, and in tiers corresponding in number to the number of said second group, a set of operating bars one for each tier, a set of operating bars one for a plurality of rows, operating links actuated by conjoint operation of bars from each set, line-controlled magnets corresponding in number to the first set of operating bars, and line-magnets for the second set of bars equal in number to the other group of lines, and restoring magnets to actuate said first set of bars to restore said switching-devices to normal.

36. In combination, a plurality of sets of movable bars, means for holding said bars in neutral position, means for moving said bars to each side of neutral position, and switching-devices actuated by conjoint movement of said bars from neutral position.

37. In combination, a plurality of sets of rotatable bars, spring means for holding said bars in neutral position, electro-magnetic means for rotating said bars to each side of neutral position, and switching-devices actuated by conjoint movement of said bars from neutral position.

38. In combination, a plurality of sets of movable bars, means for holding said bars in neutral position, means for moving said bars to each side of neutral position, switching-devices operable to close contact by conjoint movement of the bars of one set on one side of neutral position, and to the bars of the other set on either side of neutral position.

39. In combination, a plurality of sets of rotatable bars, spring means for holding said bars in neutral position, electro-magnetic means for rotating said bars to each side of neutral position, switching-devices operable to close contact by conjoint rotation of the bars of one set on one side of neutral, and of the bars of the other set on either side of neutral.

40. In combination, a plurality of sets of movable bars, means for holding said bars in neutral position, means for moving said bars to each side of neutral position, switching-devices operable to close contact by conjoint movement of the bars of one set on one side of neutral, and of the bars of the other set on either side of neutral, and means to move the bars of said one set to the other side of neutral to restore said switching-devices.

41. In combination, a plurality of sets of movable bars, means for holding said bars in neutral position, means for moving said bars to each side of neutral position, switching devices, operating links connected to bars of one set, said links being actuated by conjoint movement of the corresponding bars to either side of neutral, and movement of bars of the other set to one side of neutral, to actuate said switching-devices.

42. In combination, a plurality of incoming lines, a plurality of outgoing lines, a line relay for each incoming line, a normally-closed starting circuit controlled by each of said relays, a switching magnet for each outgoing line, said switching magnets being controlled by said starting-circuit.

43. In combination, a plurality of incoming lines, a plurality of outgoing lines, a line relay for each incoming line, a normally-closed starting-circuit controlled by each of said relays, a switching magnet for each outgoing line, said switching magnets being controlled by said starting circuit.

44. In combination, a plurality of incoming lines, a plurality of outgoing lines, a line relay for each incoming line, a normally-closed starting-circuit controlled by each of said relays, a switching magnet for each incoming line and a switching magnet for each outgoing line, said latter switching magnets being controlled by said starting-circuit.

45. In combination, a plurality of incoming lines, a plurality of outgoing lines, a line relay for each incoming line, a cut-off relay for each of said incoming lines, a normally-closed starting-circuit controlled by each of said line relays, a switching magnet for each incoming line, a switching magnet for each outgoing line, said latter switching magnets being controlled by said starting-circuit, and means to energize said cut-off relay upon joint operation of said switching-magnets.

46. In combination, a plurality of incoming lines, a plurality of outgoing lines, a plurality of switching-devices for interconnecting said lines, a normally-closed starting-circuit, a line relay for each of said incoming lines for controlling said starting-circuit, a line-finder switch having terminals connected to each of said incoming lines, and a time-limit relay in circuit with said normally-closed starting-circuit, said relay controlling said line-finding switch to connect the same with the terminals of a calling line.

47. In combination, a plurality of incoming lines, a plurality of switching-devices to connect said lines to line extensions, a normally-deënergized line relay for each line, a normally-closed starting-circuit controlled by said line relay, each line relay having an armature included in said closed circuit, and means controlled by movement of said armature to break said circuit and connect the same to operating means for said switching-devices.

48. In combination, a plurality of incoming lines, a plurality of outgoing lines, a plurality of switching-devices comprising a plurality of sets of bars and contact pieces corresponding to the intersection of a bar of each set controlled by said incoming lines for selectively interconnecting any one of said incoming lines with an outgoing line, and means to prevent simultaneous actuation of said switching-devices.

49. In combination, a plurality of incoming lines, a plurality of outgoing lines, a plurality of switching-devices comprising a plurality of sets of bars and contact pieces corresponding to the intersection of a bar of each set controlled by said incoming lines for selectively interconnecting any one of said incoming lines with an outgoing line, and means to prevent interference of simultaneously-calling lines.

50. In combination, a plurality of incoming lines, a plurality of outgoing lines, a plurality of switching-devices comprising a plurality of sets of bars and contact pieces corresponding to the intersection of a bar of each set controlled by said incoming lines for selectively interconnecting any one of said incoming lines with an outgoing line, and means for determining the order of selection between simultaneously-calling lines.

51. In combination, switching devices arranged in groups lying in intersecting planes, actuating means therefor comprising an operating element common to a group of devices in one plane, a controlling element common to a plurality of groups of devices in an intersecting plane and independently movable operating links connecting said controlling element with said operating element to actuate any desired switch device.

52. In combination, switching devices arranged in groups in intersecting planes, actuating means therefor comprising an operating element common to a group of devices in one plane, a controlling element common to a plurality of groups of devices in an intersecting plane, operating links connecting said controlling element with said operating element to actuate any desired switching device, and means for positively restoring said switching devices.

53. In combination, switching devices arranged in groups, lying in intersecting planes, actuating devices therefor, comprising an operating element common to a group of devices in one plane, a controlling element common to a group of switching devices in another plane, independently operable links connecting said controlling element with said operating element to operate any pre-determined one of said switching devices, and means to operate said operating element to restore said switching devices.

54. In combination, incoming lines, outgoing lines, switching devices not self-restoring for interconnecting said lines, operating elements in one plane, operating elements in another plane, means to actuate said operating elements to cause said switching devices to make connections between any one of said incoming lines and an idle one of said outgoing lines and means to actuate one of said operating elements to restore said switching devices.

55. In combination a group of lines, a second group of lines, switching devices not self-restoring for interconnecting said lines, operating elements for said switching devices in one plane, operating elements for said switching devices in another plane, means to actuate said elements concurrently to cause said switching devices to make connections between any desired one of said first group of lines and an idle one of said second group of lines, and means to operate one of said elements to restore said switching devices to normal.

56. In combination a first group of lines, a second group of lines, a switch bank containing terminals for said lines, switching devices not self-restoring for interconnecting said terminals, operating elements for said switching devices in one plane, operating elements for said switching devices in another plane, means to actuate said operating elements concurrently to cause said switching devices to make connection between any one of said first group of lines and a desired one of said second group of lines, and means for operating one of said operating elements to restore said switching devices to normal.

57. In combination switching devices, movable bars arranged in two intersecting planes for operating said switching devices, independently movable operating links common to a plurality of bars controlled by common operation of said bars to actuate said switching devices.

58. In combination switching devices, movable bars, said bars being arranged in two intersecting planes, independently movable links connected to the bars arranged in one plane, said links being controlled by conjoint operation of said bars to move said switching devices to close circuit position, said bar in one plane being movable without operating said switching devices.

59. In combination switching devices, a set of movable bars arranged in one plane, a second set of movable bars arranged in an intersecting plane, independently movable links forming an intersecting connection for said bars of different planes, said links being controlled by conjoint operation of said movable bars to actuate said switching devices.

60. In combination switching devices, a set of bars movable in one direction, a second set of bars movable in another direction, operating links mounted independently of said switching devices for operating said switching devices, said links partaking of the motion of said sets of bars.

61. In combination stationary terminal pairs, switching devices for each pair, a set of movable operating bars, a second set of movable operating bars at an angle to said first bars, a plurality of operating links for operating said switching devices, said links partaking of the motion of each set of said bars to operate said switching devices.

62. In a telephone switch, a plurality of switching devices, a set of movable bars arranged in one plane, a second set of movable bars arranged in an intersecting plane, said switching devices being remote from said bars, operating links controlled by the motion of bars of each set for actuating said switching devices.

63. In a telephone switch, a plurality of sets of movable bars, contact terminals remote from said bars, switching devices for connecting said terminals, independently mounted links movable in two planes for connecting the bars and the switching devices, and means for actuating a bar of each set to actuate said links to operate the switching devices.

64. In a telephone switch, a set of movable bars, a second set of movable bars, switching devices not self-restoring remote from said bars, means for moving a bar of each set to actuate said non-restoring switching devices, and means for moving one of said bars singly for restoring said non-restoring switching devices.

65. In combination a set of rotatable bars, a second set of rotatable bars, contact terminals remote from the bars of each set, switching devices for connecting said contact terminals, and operating links controlled by conjoint operation of a bar of each set to operate one of said switching devices.

66. In combination a plurality of incoming lines, a normally closed starting circuit controlled by each of said lines, and a plurality of line finding mechanisms controlled by said starting circuit.

67. In combination a plurality of incoming lines, a plurality of out-going lines, a normally closed starting circuit controlled by each of said incoming lines, and a switching magnet for each out-going line, said switching magnet being controlled by said starting circuit.

68. In combination a plurality of incoming lines, a plurality of out-going lines, a normally closed starting circuit controlled by each of said incoming lines, a switching magnet for each incoming line, a switching magnet for each outgoing line, said switching magnets being controlled by said starting circuit.

69. In combination a plurality of incoming lines, a plurality of out-going lines, a plurality of switching devices controlled by said incoming lines for selectively interconnecting any one of said incoming lines with an out-going line, and means to prevent interference of simultaneously calling lines, said means comprising a normally closed starting circuit controllable by each incoming line.

70. In a system of the class described, a plurality of incoming lines, a plurality of out-going lines, a plurality of line-finding switches for connecting a calling incoming line with an idle outgoing line, each switch comprising a bank of contacts, said bank of contacts comprising a contact for each out-going line and a connection effecting member controlled by a plurality of said incoming lines to effect a connection between an incoming calling line and an idle outgoing line and a plurality of connection effecting members individual to said outgoing lines.

71. In combination, a plurality of incoming lines, a plurality of out-going lines, a plurality of line-finding switch mechanisms for connecting a calling incoming line with an idle outgoing line, a normally closed chain starting circuit, said circuit being adapted to be opened by said incoming line upon initiation of a call, and means controlled by said circuit for causing said line-finding switch to connect the calling line with an idle out-going line.

72. In combination, a plurality of incoming lines, a plurality of out-going lines, a plurality of line-finding switch mechanisms for connecting a calling in-coming line with an idle out-going line, a normally closed chain starting circuit, said circuit being adapted to be opened by said in-coming line upon initiation of a call, and means controlled by said circuit for causing said line-finding switch to connect the calling line with an idle out-going line and automatic time controlled means for closing said normally closed circuit.

73. In combination a plurality of in-coming lines, a plurality of outgoing lines, a line-finding switch, a normally closed starting circuit controllable by each incoming line for operating said line-finding switch to connect a calling incoming line with an idle outgoing line, and a cut-off relay for each line operated upon the completion of a connection.

74. In combination, a plurality of incoming lines, a plurality of outgoing lines, a line-finding switch, a normally closed starting circuit controllable by each incoming line for operating said switch, and an operating circuit for said switch, said circuit being closed upon opening of said starting circuit, said operating circuit being connected through a pair of contacts under the control of the first idle outgoing line.

75. In combination a series of incoming lines, a plurality of outgoing lines, a line-finding switch, a normally closed starting circuit, a series of line relays for said incoming lines having normally closed contacts in said starting circuit, a line magnet in said switch for each incoming line, a connecting magnet in said switch for each outgoing line, and means controlled by said starting circuit to operate the line magnet of the calling line and the connecting magnet of the first idle outgoing line to effect a connection at said switch.

76. In combination a plurality of incoming lines, a plurality of outgoing lines, a line-finding switch, said switch comprising a set of operating bars corresponding to said incoming lines, a second set of operating bars corresponding to said outgoing lines a normally closed starting circuit controlled by each incoming line, a switch magnet for each incoming line for controlling the bars of one set, a switch magnet for each outgoing line for controlling the bars of the other set, the incoming switch magnet being operable in series with a portion of said normally closed starting circuit, a normally open link circuit having a link under the control of each outgoing line, means to close said normally open circuit through the link of the first idle outgoing line to operate the corresponding switch magnet, said means being controlled by said normally closed starting circuit.

77. In combination a plurality of lines, a plurality of trunks, a switch operating magnet for each line, a switch operating magnet for each trunk, a normally closed starting circuit having a starting magnet and an energizing connection therefor, a line relay for each line, means controlled by each line relay for disconnecting the energizing circuit and connecting the same to the corresponding operating magnet for governing the connection of a calling line to an idle trunk.

78. In combination a group of lines, a group of trunks, switching mechanism having an operating magnet corresponding to each line and an operating magnet corresponding to each trunk, a normally closed starting circuit having a starting magnet and having an energizing connection for said magnet, line relays for each line, said starting circuit being controlled by said line relays, said relays having means to break the normally closed circuit and to switch the energizing connection to the operating magnet corresponding to the line.

79. In combination a group of lines, a group of trunks, switching mechanism having operating magnets, individual to each line and to each trunk, a normally closed starting circuit having a starting magnet and having an energizing connection for said magnet, line relays for each line, means controlled by each line relay for breaking the normally closed circuit and for switching the energizing connection to the corresponding operating magnet, and means controlled by the operating magnet of each line for disabling the remaining operating magnet of the group of lines.

80. In combination a group of lines, a group of trunks, switching mechanism having a plurality of operating magnets, said magnets comprising a magnet individual to each line and a magnet individual to each trunk, a normally closed circuit having a starting magnet and having an energizing connection for said magnet, line relays for each line, said relays having means to break the normally closed circuit and to switch the energizing connection to the corresponding operating magnet of the line and means controlled by the breaking of said normally closed starting circuit for actuating the operating magnet of the first idle trunk.

81. In combination a group of lines, a group of trunks, line-finding switch mechanism, operating magnets in said switch mechanism individual to said lines, operating magnets in said switch individual to said trunks, a normally closed starting circuit having a starting magnet and having an energized connection for said magnet, line relays for each line, said relays having means to break the normally closed circuit and to switch the energizing connection to the corresponding operating magnet of the calling line, means controlled by the operating magnet of each line for disabling the remaining operating magnet of the group of lines, means controlled by the breaking of said normally closed starting circuit for actuating the operating magnet of the first idle trunk, and means controlled by the operation of the operating magnet of a line and the operating magnet of a trunk for switching the energizing connection back to said normally closed circuit and for closing said circuit.

82. In combination a group of lines, a group of trunks, line-finding switch mechanism, said switch mechanism having operating magnets individual to each line and operating magnets individual to each trunk, a normally closed starting circuit having a starting magnet and having an energizing connection for said magnet, line relays for each line, said relays having means to break the normally closed circuit and to switch the energizing connection to the corresponding operating magnet, means controlled by the breaking of said normally closed circuit for actuating the operating magnet of the first idle trunk, and means controlled by the operation of the operating magnet of a line and the operating magnet of a trunk for switching the energizing connection back to said normally closed circuit and for closing said circuit.

83. In combination a group of lines, a group of trunks, line-finding switch mechanism having a magnet governing the connection of a calling line with an idle trunk, a normally closed link starting circuit having a plurality of links, each link being under the control of one of said lines, a starting magnet, said first link comprising an energizing connection for said starting magnet, said circuit being adapted to be opened at the corresponding link by the initiation of a call upon the corresponding line, means under control of each line for switching said energizing connection to the operating magnet of said switch, and means under control of said starting circuit for actuating said switch to connect the calling line with an idle trunk.

84. In combination a group of lines, a group of trunks, means for extending a calling line into connection with an idle trunk, a starting circuit controlled by each line upon initiation of a call for conditioning said line extension means to make connection with a trunk, means under control of said starting circuit for removing the control of any other line over said starting circuit until a connection is completed, means under the control of said trunk for selecting an idle trunk and means controlled by said latter means and said starting circuit for completing a connection between said line and staid trunk.

85. In combination a group of lines, a group of trunks, means for extending a calling line into connection with an idle trunk, a normally closed starting circuit controlled by each line upon initiation of a call for conditioning said line extension means to make connection with a trunk and means under control of said starting circuit for removing the control of any other line over said starting circuit until a connection is completed.

86. In combination a group of lines, a group of trunks, means for extending a calling into connection with an idle trunk, a starting circuit controlled by each line upon initiation of a call, for conditioning said line extension, means to make connection with a trunk, means under control of said starting circuit for removing the control of any other line over said starting circuit until a connection is completed, means under the control of said trunk for selecting an idle trunk, means controlled by said latter means and by said starting circuit for completing a connection between said line and said trunk, and means governed by the completion of a connection for restoring said starting circuit to the control of said line.

87. In combination a group of lines, a group of trunks, a line-finding switch for connecting a calling line with an idle trunk, a normally closed starting circuit controlled by each line, means under the control of the starting circuit for conditioning said switch to make a connection between the calling line and an idle trunk, a private relay for each trunk, said private relay being governed by the connection of the corresponding trunk with a line, and operating means for the switch, said means being controlled by the starting circuit and by the private relay of the trunk.

88. In combination a group of lines, a group of trunks, a line extending switching mechanism for extending the connection of a calling line to an idle trunk, a normally closed starting circuit controllable by each line, means for determining the first idle trunk, said means comprising a private relay for each trunk and a chain circuit adapted to be extended by the private relay of a busy trunk to the next trunk, and operating magnets for said switch mechanism, each magnet being individual to a trunk, the magnet of an idle trunk being energized over said chain circuit.

89. In combination a group of lines, a group of trunks, automatic line extension switching mechanism for extending connection of a calling line to an idle trunk, means for determining the first idle trunk, said means comprising a private relay for each trunk and a chain circuit adapted to be extended by the private relay of a busy trunk to the next trunk, and operating magnets for said switching mechanism, each being individual to a trunk, the magnet of an idle trunk being energized over said chain circuit.

90. In combination a group of lines, a group of trunks, line extending switch mechanism for connecting a calling line with an idle trunk, a normally closed starting circuit common to said group of lines, a normally open chain circuit common to a group of lines, said normally open circuit being controlled by said starting circuit and an operating magnet for said switching mechanism individual to a trunk, said magnet being energized over said normally open chain circuit.

91. In combination a group of lines, a group of trunks, line extending switch mechanism for connecting a calling line with an idle trunk, a normally closed starting circuit common to said group of lines, a normally open chain circuit common to a group of trunks, said normally open circuit being controlled by said starting circuit, a private relay for each trunk, said normally open circuit being controlled by said starting circuit and by the private magnet of said trunk, and an operating magnet for said switching magnet individual to a trunk, said magnet being energized over said normally open chain circuit.

92. In combination a group of lines, a group of trunks, line extending switch mechanism for connecting a calling line with an idle trunk, a normally closed starting circuit common to said group of lines, a normally open chain circuit common to said group of trunks, a private relay for each trunk, said normally open circuit being controlled by said starting circuit and by the private relays of each trunk to pre-select the next idle trunk, an operating magnet for said switching mechanism individual to a trunk, said magnet being energized over said normally open chain circuit to complete the connection, and means controlled by said starting circuit for breaking the normally open chain circuit between a pre-selected trunk and the next trunk in the group until the connection is completed.

93. In combination a plurality of lines, a plurality of trunks, a line-finding switch for connecting a calling line with an idle trunk, and a normally closed starting circuit governed by each line for controlling the operation of said line-finding switch.

94. In combination a plurality of lines, a plurality of trunks, a line-finding switch for connecting a calling line with an idle trunk, a normally closed starting circuit governed by each calling line for controlling the operation of said switch, a starting magnet controlled by said starting circuit and an operating circuit for said line-finding switch controlled by said magnet for selectively connecting the first idle trunk to said calling line.

95. In combination a plurality of lines, a plurality of trunks, a line-finding switch for connecting a calling line with an idle trunk, a normally closed starting circuit governed by each line for controlling the operation of said line-finding switch, a private magnet for each trunk, a normally open chain, pre-selecting circuit controlled by the private magnet of each trunk, a starting magnet controlled by said starting circuit and an operating magnet individual to the calling line, said latter magnet being energized through said normally open chain circuit, said circuit being controlled by said starting magnet.

96. In combination a group of lines, a normally closed starting circuit, contacts in said circuit controlled by said lines, said starting circuit comprising an energizing connection at one end and a starting magnet at the other end, said contacts being connected in said circuit between said ends, a switch controlling magnet for each line for controlling the extension of said line, and a contact adjacent each contact in said circuit connected to the corresponding switch magnet, said first contacts being operable to break said starting circuit and each line having means to switch the energizing connection to the corresponding switch control magnet.

97. In combination a group of lines, a normally closed starting circuit, contacts in said circuit controlled by said lines, said starting circuit comprising an energizing connection at one end and a starting magnet at the other end, said contacts being connected in said circuit between said ends, a switch controlling magnet for each line for controlling the extension of said line, and a contact adjacent each contact in said circuit connected to the corresponding switching magnet, said first contact being operable to break said starting circuit and each line having means to switch the energizing connection to the corresponding switch control magnet and a locking circuit for each switch controlling magnet.

98. In combination a group of lines, line relays for said lines, a normally closed starting circuit, contacts in said circuit controlled by said line relays, said starting circuit comprising an energizing connection at one end and a starting magnet at the other end, said relay contact being connected between said ends, a switch controlling magnet for each line for controlling extension of said line, a contact at each relay connected to the corresponding switching magnet, said relays being operable to break said starting circuit and to switch the energizing connection to the corresponding switch control magnet.

99. In combination a group of lines, line relays for said lines, a normally closed starting circuit, contacts in said circuit controlled by said line relays, said starting circuit comprising an energizing connection at one end and a starting magnet at the other end, said relay contacts being connected between said ends, a switch controlling magnet for each line for controlling extension of said line, a contact at each relay connected to the corresponding switching magnet, said relays being operable to break said starting circuit and to switch the energizing connection to the corresponding switch control magnet.

100. In combination a group of lines, line relays for said lines, a normally closed starting circuit, contacts in said circuit controlled by said line relays, said starting circuit comprising an energizing connection at one end and a starting magnet at the other end, said relay contacts being connected between said ends, a switch controlling magnet for each line for controlling extension of said line, a contact at each relay connected to the corresponding switch magnet, said relays being operable to break said starting circuit and to switch the energizing connection to the corresponding switch control magnet, and a locking connection for said switch control magnet, said connection being connected to the starting circuit between the relay contacts.

101. In combination a group of lines, automatic line extending switching mechanism, a normally closed starting circuit for the switching mechanism, contacts in the starting circuit controlled by each line and time controlled means operable upon an abnormally long breaking of said normally closed starting circuit for automatically extending the corresponding line to a special terminal.

102. In combination a group of lines, automatic line extending switching mechanism, a normally closed starting circuit for said switching mechanism, contacts in the starting circuit controlled by each line, a starting magnet for said circuit and means controlled by said starting magnet to connect a calling line to an idle line extension and time controlled means operable upon an abnormally long opening of said normally closed circuit for automatically extending the corresponding line to a special terminal independently of said line extending switching mechanism.

103. In combination a group of lines, a group of trunks, a line selecting switch, a normally closed starting circuit governing the connection of a calling line with an idle trunk, line relays having contacts in said starting circuit, time controlled means governed by the abnormal operation of any one of said relay contacts for switching said line into connection with a special terminal upon a manual switchboard.

104. In combination a group of lines, a group of trunks, a line selecting switch, a normally closed starting circuit governing the connection of a calling line with an idle trunk, line relays having contacts in said starting circuit, a manual switchboard having a special terminal thereupon and time controlled means governed by the abnormal operation of any one of said line relays for automatically switching said line into connection with said special terminal independently of said line selecting switch.

105. In combination a group of lines, a group of trunks, a line selecting switch, a normally closed starting circuit governing the connection of a calling line with an idle trunk, line relays having contacts in said starting circuit, a manual switchboard having a special terminal thereupon and time controlled means governed by the abnormal operation of any one of said line relays for automatically switching said line into connection with said special terminal independently of said line selecting switch, and an indicator upon said switchboard for indicating the abnormally operated contact.

106. In combination a group of lines, a group of trunks, a line selecting switch, a normally closed starting circuit governing the connection of a calling line with an idle trunk, line relays having contacts in said starting circuit, a manual switchboard having a special terminal thereupon and time controlled means governed by the abnormal operation of any one of said line relays for automatically switching said line into connection with said special terminal independently of said line selecting switch, and an indicator upon said switchboard for indicating the abnormally operated contact, and multiple terminals upon said switchboard for each of said lines, and link circuits for manually completing a connection independently of said line selecting switch.

107. In combination a plurality of sets of movable bars, contact terminals remote from said bars, switching devices for connecting said terminals, means for actuating a bar of each set to actuate said switching devices, and means for preventing more than one bar of each set from being actuated at a time.

108. The method of distributing incoming calls from a plurality of lines among a plurality of terminal points which consists in, transmitting the call to a central distributing point, then forwarding the call to one terminal point, and simultaneously mechanically affecting the central distributing point to direct a second call whether simultaneous with or subsequent to the other call to a different terminal point.

109. The method of distributing calls from a plurality of incoming lines to a plurality of outgoing lines which consists in, transmitting each incoming call to a central point, causing said call to operate on a common central distributing element to forward the call to one outgoing line, simultaneously affecting the common distributing element to disable it with respect to the incoming and outgoing lines which were inter-connected, and then causing a second call whether simultaneous with or subsequent to the other call to affect the common distributing element to forward said second call to a different outgoing line.

110. In combination, a plurality of incoming lines, a plurality of outgoing lines, a switching device for inter-connecting said lines and means for determining the order of distribution of incoming calls whether simultaneous or successive among the outgoing lines.

111. In combination, a plurality of incoming lines, a plurality of outgoing lines, switching means for the lines comprising contacts arranged in a bank, said switching means having means for connecting calling lines whether the calls are simultaneous or successive to different outgoing lines.

112. In combination, a plurality of incoming lines, a plurality of outgoing lines, switching means comprising contacts for each of the lines for inter-connecting the same, and mechanically operated elements for actuating the contacts, said mechanically operated elements being organized to prevent positively interference in connection between incoming calls.

113. In combination, incoming lines, outgoing lines, switching mechanism for inter-connecting said lines, a controlling circuit adapted to be affected by said incoming lines to control inter-connection of the lines, and means for independently switching a line which improperly affects the controlling circuit to an outgoing line.

114. In combination, a plurality of incoming lines, a plurality of outgoing lines, contacts for inter-connecting said lines, said contacts being arranged in groups in intersecting planes, and operating element for each intersecting plane, and a single link common to a plurality of said elements and common to a group of contacts.

115. In combination, a plurality of incoming lines, a plurality of outgoing lines, switching means for inter-connecting said lines, a controlling circuit common to the incoming lines to determine the order of inter-connection of the lines and time controlled means for changing the order of inter-connection of said lines.

116. In combination, two groups of circuits, a switch associated therewith, terminals of each group at said switch, sets of shafts, the shafts of one set being at an angle to those of the other, means whereby the operation of a shaft of each set will effect electrical connection between the terminals of a predetermined circuit of each group, and means to prevent simultaneous effective operation of more than one such pair of shafts.

117. In combination, two groups of circuits, a switch comprising sets of rotatable shafts, the shafts of one set being at an angle to those of the other, multiple terminals of the circuits of each said group, means whereby the operation of a shaft of each set will effect electrical connection between the terminals of a predetermined circuit of each group, and means to prevent simultaneous effective operation of more than one such pair of shafts.

118. In a telephone system, a plurality of incoming lines, a plurality of outgoing lines, a switch mechanism for interconnecting said lines comprising intersecting shafts, contact sets acting as terminals for said lines, means effective upon conjoint angular displacement of two intersecting shafts for operating a contact set for interconnecting an incoming and an outgoing line, and means for preventing the simultaneous effective operation of more than two intersecting shafts.

119. In a telephone system, a group of incoming lines and a group of outgoing lines, a switch comprising sets of intersecting shafts, multiple terminals for the circuits of said groups, means whereby the operation of a shaft of each set will effect electrical connection between the terminals of a predetermined circuit of each group, and means for preventing the simultaneous effective operation of more than two intersecting shafts.

120. A telephone system comprising telephone lines, link circuits, automatic means for interconnecting said lines and link circuits, and auxiliary means automatically operative upon disabling of the automatic interconnecting means for extending the circuits of said lines.

121. A telephone system comprising telephone lines, link circuits, automatic means for interconnecting said lines and link circuits, auxiliary means automatically operative upon disabling of the automatic interconnecting means for extending the circuits of said lines, and means for indicating the source of trouble.

122. A telephone system comprising telephone lines, extension circuits for said lines, automatic means for interconnecting said lines and circuits, means for each of said lines for controlling the starting of the interconnecting operation, and auxiliary means automatically operative upon disabling of the starting means for extending the circuits of said lines.

123. A telephone system comprising telephone lines, operator's link circuits, automatic means for interconnecting said lines and link circuits, means for each of said lines for controlling the starting of the interconnecting means, another operator's circuit, and auxiliary means automatically operative upon disabling of the starting means for extending the circuit of a calling line to said other operator's circuit.

124. In a telephone system, a group of incoming telephone lines, a group of outgoing telephone lines, electromagnetically operated contact sets for interconnecting said lines, electromagnets less in number than the contact sets, means whereby the operation of a certain two electromagnets will operate contact sets to connect a calling incoming line and predetermined calling outgoing line, and means for preventing the effective simultaneous operation of more than one such pair of electromagnets.

In witness whereof, I hereunto subscribe my name this 2nd day of September, A. D. 1915.

HARRY G. WEBSTER.